United States Patent
Tang et al.

(10) Patent No.: US 10,484,984 B2
(45) Date of Patent: Nov. 19, 2019

(54) RESOURCE ALLOCATION METHOD AND APPARATUS

(71) Applicant: Huawei Technologies Co., Ltd., Shenzhen (CN)

(72) Inventors: Hao Tang, Shanghai (CN); Yi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/906,994

(22) Filed: Feb. 27, 2018

(65) Prior Publication Data

US 2018/0192406 A1 Jul. 5, 2018

Related U.S. Application Data

(63) Continuation of application No. PCT/CN2015/088692, filed on Aug. 31, 2015.

(51) Int. Cl.
*H04W 72/04* (2009.01)
*H04L 1/00* (2006.01)
(Continued)

(52) U.S. Cl.
CPC ......... *H04W 72/042* (2013.01); *H04W 28/20* (2013.01); *H04W 72/04* (2013.01);
(Continued)

(58) Field of Classification Search
USPC ................................................ 370/329, 330
See application file for complete search history.

(56) References Cited

U.S. PATENT DOCUMENTS

2009/0245193 A1 10/2009 Gaal et al.
2011/0085508 A1* 4/2011 Wengerter ............ H04L 5/0094
370/329

(Continued)

FOREIGN PATENT DOCUMENTS

CN 101765208 A 6/2010
CN 101978645 A 2/2011
(Continued)

OTHER PUBLICATIONS

Ku, Gwanmo, et al., "Resource Allocation and Link Adaptation in LTE and LTE Advanced: A Tutorial", IEEE Communication Surveys & Tutorials, vol. 17, No. 3, Third Quarter 2015, pp. 1605-1633.

*Primary Examiner* — Asad M Nawaz
*Assistant Examiner* — Jason A Harley
(74) *Attorney, Agent, or Firm* — Slater Matsil, LLP

(57) ABSTRACT

Embodiments provide a method for resource allocation, a terminal and a base station are disclosed. In an embodiment the method includes receiving, by a terminal, resource allocation information from a base station, wherein the terminal supports a new system carrier, wherein the new system carrier comprises a component carrier and an extension carrier, and wherein the resource allocation information comprises a resource allocation type and indication information of a first resource block unit and determining, by the terminal, according to the resource allocation information and a mapping relationship between a resource block unit and a physical resource, a first physical resource corresponding to the first resource block unit, wherein the mapping relationship between the resource block unit and the physical resource comprises a first mapping relationship and a second mapping relationship.

20 Claims, 14 Drawing Sheets

A terminal receives resource allocation information sent by a base station, where the terminal supports a new system carrier, the new system carrier includes a component carrier and an extension carrier, and the resource allocation information includes a resource allocation type and indication information of a first resource block unit allocated by the base station to the terminal — S301

The terminal determines, according to the resource allocation information and a mapping relationship between a resource block unit and a physical resource, a first physical resource corresponding to the first resource block unit allocated by the base station to the terminal — S302

(51) Int. Cl.
*H04W 72/00* (2009.01)
*H04J 3/14* (2006.01)
*H04W 28/20* (2009.01)
*H04W 72/12* (2009.01)
*H04W 88/12* (2009.01)

(52) U.S. Cl.
CPC ... *H04W 72/0453* (2013.01); *H04W 72/1263* (2013.01); *H04W 88/12* (2013.01)

(56) References Cited

U.S. PATENT DOCUMENTS

| | | | | |
|---|---|---|---|---|
| 2012/0014330 | A1* | 1/2012 | Damnjanovic | H04L 5/001 370/329 |
| 2012/0243498 | A1* | 9/2012 | Kwon | H04L 5/00 370/329 |
| 2013/0070693 | A1* | 3/2013 | Kwon | H04L 5/001 370/329 |
| 2013/0128852 | A1 | 5/2013 | Xue et al. | |
| 2013/0265982 | A1 | 10/2013 | Fwu et al. | |
| 2016/0353444 | A1 | 12/2016 | Popovic et al. | |

FOREIGN PATENT DOCUMENTS

| | | |
|---|---|---|
| CN | 102246581 A | 11/2011 |
| CN | 102340875 A | 2/2012 |
| CN | 102668673 A | 9/2012 |
| CN | 102970753 A | 3/2013 |
| CN | 103108394 A | 5/2013 |
| CN | 103493557 A | 1/2014 |
| JP | 2011516006 A | 5/2011 |
| WO | 2009120827 A1 | 10/2009 |
| WO | 2011084822 A1 | 7/2011 |
| WO | 2013067675 A1 | 5/2013 |

* cited by examiner

| PRB | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| RBG | 0 | | 1 | | 2 | | 3 | | 4 | | 5 | | 6 | | 7 | | 8 | | 9 | | 10 | | 11 | | 12 |

CONT.
FROM
FIG. 2C-1

RESOURCE ALLOCATION METHOD AND APPARATUS

CROSS-REFERENCE TO RELATED APPLICATIONS

This application is a continuation of International Application No. PCT/CN2015/088692, filed on Aug. 31, 2015, the disclosure of which is hereby incorporated by reference in its entirety.

TECHNICAL FIELD

Embodiments of the present invention relate to communications technologies, and in particular, to a resource allocation method and an apparatus.

BACKGROUND

In a Long Term Evolution (LTE) technology, six standard component carriers of 1.4 MHz, 3 MHz, 5 MHz, 10 MHz, 15 MHz, and 20 MHz are supported, and resource blocks occupied by one standard component carrier is different from that of the resource blocks occupied by another standard component carrier. A conventional terminal may transmit data by using a standard component carrier.

SUMMARY

Embodiments of the present invention provide a resource allocation method and an apparatus, so that a resource allocation method applied to a new system carrier is implemented, and the new system carrier is accordingly compatible with a conventional terminal.

Embodiments of the present invention provide an extension carrier technology for a standard component carrier. The extension carrier technology may be introduced to better use an idle carrier in a communications system. For example, FIG. 1A shows a new system carrier that includes an extension carrier and a standard component carrier is introduced. Further embodiments provide a new terminal that can support the new system carrier.

According to a first aspect, an embodiment of the present invention provides a resource allocation method, including determining, by a base station, a first physical resource to be allocated to a terminal and a resource allocation type, where the terminal supports a new system carrier, and the new system carrier includes a component carrier and an extension carrier; determining, by the base station according to the resource allocation type and a mapping relationship between a resource block unit and a physical resource, a first resource block unit corresponding to the first physical resource, where the resource block unit is a resource allocation granularity in which the base station allocates a resource to the terminal, the mapping relationship between a resource block unit and a physical resource includes a first mapping relationship and a second mapping relationship, the first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier, and the second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier; and sending, by the base station, resource allocation information to the terminal, where the resource allocation information includes the resource allocation type and indication information of the first resource block unit allocated by the base station to the terminal.

With reference to the first aspect, in a first possible implementation of the first aspect, the physical resource is a physical resource block (PRB); and if the resource allocation type is a resource allocation type 0 or a resource allocation type 1, the resource block unit is a resource block group (RBG), and the first resource block unit is a first RBG; or if the resource allocation type is a resource allocation type 2, the resource block unit is a virtual resource block (VRB), and the first resource block unit is a first VRB; and correspondingly, the resource allocation information further includes mapping manner information.

With reference to the first aspect or the first possible implementation of the first aspect, in a second possible implementation of the first aspect, the resource allocation information is downlink control information (DCI).

With reference to the first or the second possible implementation of the first aspect, in a third possible implementation of the first aspect, if the resource block unit is a resource block group RBG, and the first resource block unit is a first RBG, the first mapping relationship is a mapping relationship obtained by dividing, into at least one RBG according to a first division threshold, PRBs occupied by the first part of component carrier in the component carrier, where the first division threshold is determined according to a bandwidth of the component carrier and a relationship between an RBG and a system bandwidth, and a quantity of PRBs occupied by the first part of component carrier is an integer multiple of the first division threshold; and if a quantity of PRBs occupied by the remaining part of component carrier other than the first part of component carrier in the component carrier is less than the first division threshold, the second mapping relationship is a mapping relationship obtained by dividing, into at least one RBG according to the first division threshold or a second division threshold, PRBs occupied by the first extension carrier that includes the extension carrier and the remaining part of component carrier other than the first part of component carrier in the component carrier, where the second division threshold is different from the first division threshold and is determined according to a bandwidth of the first extension carrier and the relationship between an RBG and a system bandwidth.

With reference to the first or the second possible implementation of the first aspect, in a fourth possible implementation of the first aspect, if the resource block unit is a virtual resource block VRB, and the first resource block unit is a first VRB, the first mapping relationship is a mapping relationship obtained by mapping, in a distributed VRB mapping manner to PRBs occupied by the component carrier, VRBs that are in VRBs occupied by the component carrier and that participate in interleaving, where the VRBs that participate in interleaving are VRBs occupied by the first part of component carrier; and the second mapping relationship is a mapping relationship obtained by mapping, in the distributed VRB mapping manner to a PRB occupied by the extension carrier and a remaining PRB in PRBs occupied by the component carrier, a VRB occupied by the extension carrier and a VRB that is in the VRBs occupied by the component carrier and that does not participate in interleaving, where the VRB that does not participate in interleaving and the VRB occupied by the extension carrier are VRBs occupied by the first extension carrier.

With reference to the fourth possible implementation of the first aspect, in a fifth possible implementation of the first aspect, the first mapping relationship is obtained in the following manner: determining a first RB gap according to a bandwidth of the component carrier, where the first RB gap is a value of a gap between PRBs to which a same VRB occupied by the component carrier is mapped in two different timeslots of a same subframe; determining, according to the bandwidth of the component carrier and the first RB gap, a quantity of VRBs that are in the VRBs occupied by the component carrier and that participate in interleaving; and mapping, in the distributed VRB mapping manner to the PRBs occupied by the component carrier, the VRBs that participate in interleaving.

With reference to the fourth possible implementation of the first aspect, in a sixth possible implementation of the first aspect, the second mapping relationship is obtained in the following manner: determining a second RB gap according to a bandwidth of the first extension carrier, where the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe; determining, according to the bandwidth of the first extension carrier and the second RB gap, a quantity of VRBs that are in the VRBs occupied by the first extension carrier and that participate in interleaving; and performing distributed VRB mapping on the VRBs that participate in interleaving, and performing localized VRB mapping on a VRB that is in the VRBs occupied by the first extension carrier and that does not participate in interleaving.

With reference to any one of the first aspect, or the first to the sixth possible implementations of the first aspect, in a seventh possible implementation of the first aspect, before the determining, by a base station, a first physical resource to be allocated to a terminal and a resource allocation type, the method further includes: determining, by the base station, that the terminal is a terminal that supports the new system carrier.

According to a second aspect, an embodiment of the present invention provides a resource allocation method, including: receiving, by a terminal, resource allocation information sent by a base station, where the terminal supports a new system carrier, the new system carrier includes a component carrier and an extension carrier, and the resource allocation information includes a resource allocation type and indication information of a first resource block unit allocated by the base station to the terminal; and determining, by the terminal according to the resource allocation information and a mapping relationship between a resource block unit and a physical resource, a first physical resource corresponding to the first resource block unit allocated by the base station to the terminal, where the mapping relationship between a resource block unit and a physical resource includes a first mapping relationship and a second mapping relationship, the first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier, and the second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

With reference to the second aspect, in a first possible implementation of the second aspect, the physical resource is a physical resource block PRB; if the resource allocation type is a resource allocation type 0 or a resource allocation type 1, the resource block unit is a resource block group RBG, and the first resource block unit is a first RBG; and correspondingly, the determining, by the terminal according to the resource allocation information and a mapping relationship between a resource block unit and a physical resource, a first physical resource corresponding to the first resource block unit allocated by the base station to the terminal includes: determining, by the terminal, the first PRB according to the indication information of the first resource block unit and a mapping relationship that is between a resource block unit and a PRB and that is corresponding to the resource allocation type; or if the resource allocation type is a resource allocation type 2, the resource block unit is a virtual resource block VRB, and the first resource block unit is a first VRB; correspondingly, the resource allocation information further includes mapping manner information; and the determining, by the terminal according to the resource allocation information and a mapping relationship between a resource block unit and a physical resource, a first physical resource corresponding to the first resource block unit allocated by the base station to the terminal includes: determining, by the terminal, the first PRB according to the indication information of the first resource block unit and a mapping relationship that is between a resource block unit and a PRB and that is corresponding to both the resource allocation type and the mapping manner information.

With reference to the second aspect or the first possible implementation of the second aspect, in a second possible implementation of the second aspect, the resource allocation information is downlink control information (DCI).

With reference to the first or the second possible implementation of the second aspect, in a third possible implementation of the second aspect, if the resource block unit is a resource block group RBG, and the first resource block unit is a first RBG, the first mapping relationship is a mapping relationship obtained by dividing, into at least one RBG according to a first division threshold, PRBs occupied by the first part of component carrier in the component carrier, where the first division threshold is determined according to a bandwidth of the component carrier and a relationship between an RBG and a system bandwidth, and a quantity of PRBs occupied by the first part of component carrier is an integer multiple of the first division threshold; and if a quantity of PRBs occupied by the remaining part of component carrier other than the first part of component carrier in the component carrier is less than the first division threshold, the second mapping relationship is a mapping relationship obtained by dividing, into at least one RBG according to the first division threshold or a second division threshold, PRBs occupied by the first extension carrier that includes the extension carrier and the remaining part of component carrier other than the first part of component carrier in the component carrier, where the second division threshold is different from the first division threshold and is determined according to a bandwidth of the first extension carrier and the relationship between an RBG and a system bandwidth.

With reference to the first or the second possible implementation of the second aspect, in a fourth possible implementation of the second aspect, if the resource block unit is a virtual resource block VRB, and the first resource block unit is a first VRB, the first mapping relationship is a mapping relationship obtained by mapping, in a distributed VRB mapping manner to PRBs occupied by the component carrier, VRBs that are in VRBs occupied by the component carrier and that participate in interleaving, where the VRBs that participate in interleaving are VRBs occupied by the first part of component carrier; and the second mapping relationship is a mapping relationship obtained by mapping, in the distributed VRB mapping manner to a PRB occupied by the extension carrier and a remaining PRB in PRBs occupied by the component carrier, a VRB occupied by the extension carrier and a VRB that is in the VRBs occupied by the component carrier and that does not participate in interleaving, where the VRB that does not participate in interleaving and the VRB occupied by the extension carrier are VRBs occupied by the first extension carrier.

With reference to the fourth possible implementation of the second aspect, in a fifth possible implementation of the second aspect, the first mapping relationship is obtained in the following manner: determining a first RB gap according to a bandwidth of the component carrier, where the first RB gap is a value of a gap between PRBs to which a same VRB occupied by the component carrier is mapped in two different timeslots of a same subframe; determining, according to the bandwidth of the component carrier and the first RB gap, a quantity of VRBs that are in the VRBs occupied by the component carrier and that participate in interleaving; and mapping, in the distributed VRB mapping manner to the PRBs occupied by the component carrier, the VRBs that participate in interleaving.

With reference to the fourth possible implementation of the second aspect, in a sixth possible implementation of the second aspect, the second mapping relationship is obtained in the following manner: determining a second RB gap according to a bandwidth of the first extension carrier, where the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe; determining, according to the bandwidth of the first extension carrier and the second RB gap, a quantity of VRBs that are in the VRBs occupied by the first extension carrier and that participate in interleaving; and performing distributed VRB mapping on the VRBs that participate in interleaving, and performing localized VRB mapping on a VRB that is in the VRBs occupied by the first extension carrier and that does not participate in interleaving.

With reference to any one of the second aspect, or the first to the sixth possible implementations of the second aspect, in a seventh possible implementation of the second aspect, before the receiving, by a terminal, resource allocation information sent by a base station, the method further includes sending, by the terminal, terminal type information to the base station.

According to a third aspect, an embodiment of the present invention provides a base station, including: a first determining module, configured to determine a first physical resource to be allocated to a terminal and a resource allocation type, where the terminal supports a new system carrier, and the new system carrier includes a component carrier and an extension carrier; a second determining module, configured to determine, according to the resource allocation type and a mapping relationship between a resource block unit and a physical resource, a first resource block unit corresponding to the first physical resource, where the resource block unit is a resource allocation granularity in which the base station allocates a resource to the terminal, the mapping relationship between a resource block unit and a physical resource includes a first mapping relationship and a second mapping relationship, the first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier, and the second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier; and a sending module, configured to send resource allocation information to the terminal, where the resource allocation information includes the resource allocation type and indication information of the first resource block unit allocated by the base station to the terminal.

With reference to the third aspect, in a first possible implementation of the third aspect, the physical resource is a physical resource block PRB; and if the resource allocation type is a resource allocation type 0 or a resource allocation type 1, the resource block unit is a resource block group RBG, and the first resource block unit is a first RBG; or if the resource allocation type is a resource allocation type 2, the resource block unit is a virtual resource block VRB, and the first resource block unit is a first VRB; and correspondingly, the resource allocation information further includes mapping manner information.

With reference to the third aspect or the first possible implementation of the third aspect, in a second possible implementation of the third aspect, the resource allocation information is downlink control information DCI.

With reference to the first or the second possible implementation of the third aspect, in a third possible implementation of the third aspect, if the resource block unit is a resource block group RBG, and the first resource block unit is a first RBG, the first mapping relationship is a mapping relationship obtained by dividing, into at least one RBG according to a first division threshold, PRBs occupied by the first part of component carrier in the component carrier, where the first division threshold is determined according to a bandwidth of the component carrier and a relationship between an RBG and a system bandwidth, and a quantity of PRBs occupied by the first part of component carrier is an integer multiple of the first division threshold; and if a quantity of PRBs occupied by the remaining part of component carrier other than the first part of component carrier in the component carrier is less than the first division threshold, the second mapping relationship is a mapping relationship obtained by dividing, into at least one RBG according to the first division threshold or a second division threshold, PRBs occupied by the first extension carrier that includes the extension carrier and the remaining part of component carrier other than the first part of component carrier in the component carrier, where the second division threshold is different from the first division threshold and is determined according to a bandwidth of the first extension carrier and the relationship between an RBG and a system bandwidth.

With reference to the first or the second possible implementation of the third aspect, in a fourth possible implementation of the third aspect, if the resource block unit is a virtual resource block VRB, and the first resource block unit is a first VRB, the first mapping relationship is a mapping relationship obtained by mapping, in a distributed VRB mapping manner to PRBs occupied by the component carrier, VRBs that are in VRBs occupied by the component carrier and that participate in interleaving, where the VRBs that participate in interleaving are VRBs occupied by the first part of component carrier; and the second mapping relationship is a mapping relationship obtained by mapping, in the distributed VRB mapping manner to a PRB occupied by the extension carrier and a remaining PRB in PRBs occupied by the component carrier, a VRB occupied by the extension carrier and a VRB that is in the VRBs occupied by the component carrier and that does not participate in interleaving, where the VRB that does not participate in interleaving and the VRB occupied by the extension carrier are VRBs occupied by the first extension carrier.

With reference to the fourth possible implementation of the third aspect, in a fifth possible implementation of the third aspect, the first mapping relationship is obtained in the following manner: determining a first RB gap according to a bandwidth of the component carrier, where the first RB gap is a value of a gap between PRBs to which a same VRB occupied by the component carrier is mapped in two different timeslots of a same subframe; determining, according to the bandwidth of the component carrier and the first RB gap, a quantity of VRBs that are in the VRBs occupied by the component carrier and that participate in interleaving; and mapping, in the distributed VRB mapping manner to the PRBs occupied by the component carrier, the VRBs that participate in interleaving.

With reference to the fourth possible implementation of the third aspect, in a sixth possible implementation of the third aspect, the second mapping relationship is obtained in the following manner: determining a second RB gap according to a bandwidth of the first extension carrier, where the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe; determining, according to the bandwidth of the first extension carrier and the second RB gap, a quantity of VRBs that are in the VRBs occupied by the first extension carrier and that participate in interleaving; and performing distributed VRB mapping on the VRBs that participate in interleaving, and performing localized VRB mapping on a VRB that is in the VRBs occupied by the first extension carrier and that does not participate in interleaving.

With reference to any one of the third aspect, or the first to the sixth possible implementations of the third aspect, in a seventh possible implementation of the third aspect, the base station further includes a storage module, and the storage module is configured to store the mapping relationship between a resource block unit and a physical resource.

With reference to any one of the third aspect, or the first to the seventh possible implementations of the third aspect, in an eighth possible implementation of the third aspect, the base station further includes an identification module configured to determine that the terminal is a terminal that supports the new system carrier.

According to a fourth aspect, an embodiment of the present invention provides a terminal, including: a receiving module configured to receive resource allocation information sent by a base station, where the terminal supports a new system carrier, the new system carrier includes a component carrier and an extension carrier, and the resource allocation information includes a resource allocation type and indication information of a first resource block unit allocated by the base station to the terminal; and a determining module configured to determine, according to the resource allocation information and a mapping relationship between a resource block unit and a physical resource, a first physical resource corresponding to the first resource block unit allocated by the base station to the terminal, where the mapping relationship between a resource block unit and a physical resource includes a first mapping relationship and a second mapping relationship, the first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier, and the second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

With reference to the fourth aspect, in a first possible implementation of the fourth aspect, the physical resource is a physical resource block PRB; if the resource allocation type is a resource allocation type 0 or a resource allocation type 1, the resource block unit is a resource block group RBG, and the first resource block unit is a first RBG; and correspondingly, the determining module is specifically configured to determine the first PRB according to the indication information of the first resource block unit and a mapping relationship that is between a resource block unit and a PRB and that is corresponding to the resource allocation type; or if the resource allocation type is a resource allocation type 2, the resource block unit is a virtual resource block VRB, and the first resource block unit is a first VRB; correspondingly, the resource allocation information further includes mapping manner information; and the determining module is specifically configured to determine the first PRB according to the indication information of the first resource block unit and a mapping relationship that is between a resource block unit and a PRB and that is corresponding to both the resource allocation type and the mapping manner information.

With reference to the fourth aspect or the first possible implementation of the fourth aspect, in a second possible implementation of the fourth aspect, the resource allocation information is downlink control information DCI.

With reference to the first or the second possible implementation of the fourth aspect, in a third possible implementation of the fourth aspect, if the resource block unit is a resource block group RBG, and the first resource block unit is a first RBG, the first mapping relationship is a mapping relationship obtained by dividing, into at least one RBG according to a first division threshold, PRBs occupied by the first part of component carrier in the component carrier, where the first division threshold is determined according to a bandwidth of the component carrier and a relationship between an RBG and a system bandwidth, and a quantity of PRBs occupied by the first part of component carrier is an integer multiple of the first division threshold; and if a quantity of PRBs occupied by the remaining part of component carrier other than the first part of component carrier in the component carrier is less than the first division threshold, the second mapping relationship is a mapping relationship obtained by dividing, into at least one RBG according to the first division threshold or a second division threshold, PRBs occupied by the first extension carrier that includes the extension carrier and the remaining part of component carrier other than the first part of component carrier in the component carrier, where the second division threshold is different from the first division threshold and is determined according to a bandwidth of the first extension carrier and the relationship between an RBG and a system bandwidth.

With reference to the first or the second possible implementation of the fourth aspect, in a fourth possible implementation of the fourth aspect, if the resource block unit is a virtual resource block VRB, and the first resource block unit is a first VRB, the first mapping relationship is a mapping relationship obtained by mapping, in a distributed VRB mapping manner to PRBs occupied by the component carrier, VRBs that are in VRBs occupied by the component carrier and that participate in interleaving, where the VRBs that participate in interleaving are VRBs occupied by the first part of component carrier; and the second mapping relationship is a mapping relationship obtained by mapping, in the distributed VRB mapping manner to a PRB occupied by the extension carrier and a remaining PRB in PRBs occupied by the component carrier, a VRB occupied by the extension carrier and a VRB that is in the VRBs occupied by the component carrier and that does not participate in interleaving, where the VRB that does not participate in interleaving and the VRB occupied by the extension carrier are VRBs occupied by the first extension carrier.

With reference to the fourth possible implementation of the fourth aspect, in a fifth possible implementation of the fourth aspect, the first mapping relationship is obtained in the following manner: determining a first RB gap according to a bandwidth of the component carrier, where the first RB gap is a value of a gap between PRBs to which a same VRB occupied by the component carrier is mapped in two different timeslots of a same subframe; determining, according to the bandwidth of the component carrier and the first RB gap, a quantity of VRBs that are in the VRBs occupied by the component carrier and that participate in interleaving; and mapping, in the distributed VRB mapping manner to the PRBs occupied by the component carrier, the VRBs that participate in interleaving.

With reference to the fourth possible implementation of the fourth aspect, in a sixth possible implementation of the fourth aspect, the second mapping relationship is obtained in the following manner: determining a second RB gap according to a bandwidth of the first extension carrier, where the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe; determining, according to the bandwidth of the first extension carrier and the second RB gap, a quantity of VRBs that are in the VRBs occupied by the first extension carrier and that participate in interleaving; and performing distributed VRB mapping on the VRBs that participate in interleaving, and performing localized VRB mapping on a VRB that is in the VRBs occupied by the first extension carrier and that does not participate in interleaving.

With reference to any one of the fourth aspect, or the first to the sixth possible implementations of the fourth aspect, in a seventh possible implementation of the fourth aspect, the terminal further includes a storage module, and the storage module is configured to store the mapping relationship between a resource block unit and a physical resource.

With reference to any one of the fourth aspect, or the first to the seventh possible implementations of the fourth aspect, in an eighth possible implementation of the fourth aspect, the terminal further includes a reporting module configured to send terminal type information to the base station.

In the embodiments of the present invention, the base station determines the resource allocation type and the first physical resource that is to be allocated to the terminal that supports the new system carrier; further determines, according to the resource allocation type and the mapping relationship between a resource block unit and a physical resource, the first resource block unit corresponding to the first physical resource; and then sends the resource allocation information that includes the resource allocation type and the indication information of the first resource block unit to the terminal, so that the resource allocation method applied to the new system carrier is implemented. Further, the first mapping relationship is the mapping relationship obtained by mapping, according to the resource allocation type and the bandwidth of the first part of component carrier in the component carrier, the resource block unit occupied by the first part of component carrier to the physical resource occupied by the first part of component carrier. Therefore, it can be ensured that when a new terminal transmits data by using the new system carrier, a conventional terminal can also transmit data by using a standard component carrier, that is, the new system carrier is compatible with the conventional terminal, so that resource utilization can be improved.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1B is a schematic diagram 1 of RBG division;

FIG. 1E-1 and FIG. 1E-2 are a schematic diagram of distributed resource allocation for a conventional terminal and that for a new terminal;

FIG. 2B-1 and FIG. 2B-2 are a schematic diagram 2 of RBG division for a conventional terminal and that for a new terminal;

FIG. 2C-1 and FIG. 2C-2 are a schematic diagram 2 of distributed resource allocation;

DETAILED DESCRIPTION OF ILLUSTRATIVE EMBODIMENTS

Figure 1A:
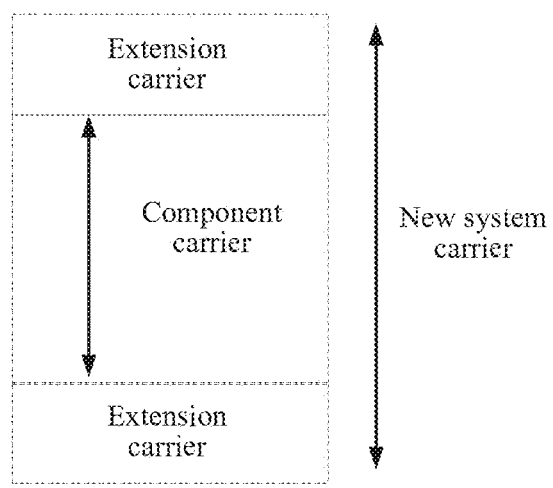
FIG. 1A is a schematic diagram of a new system carrier.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A base station (for example, an access point) in the embodiments of the present invention may be a device that communicates with a wireless terminal by using one or more sectors over an air interface in an access network. The base station may be configured to perform mutual conversion between a received over-the-air frame and an IP packet, and serve as a router between the wireless terminal and a remaining part of the access network. The remaining part of the access network may include an Internet Protocol (IP) network. The base station may further coordinate attribute management of the air interface. For example, the base station may be a base transceiver station (BTS, Base Transceiver Station) in GSM or CDMA, a NodeB (NodeB) in WCDMA, or an evolved NodeB in LTE. This is not limited in the embodiments of the present invention.

A terminal or user equipment in the embodiments of the present invention may be a wireless terminal. The wireless terminal may be a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment. A conventional terminal is a terminal that supports only a standard component carrier, for example, a Release-8 terminal or a Release-9 terminal. A new terminal is a terminal that can support a new system carrier, for example, a Release-15 terminal or a Release-16 terminal.

A standard component carrier (which is briefly referred to as a component carrier) in the embodiments of the present invention is a carrier corresponding to a standard system bandwidth, for example, component carriers corresponding to six standard system bandwidths (1.4 MHz, 3 MHz, 5 MHz, 10 MHz, 15 MHz, and 20 MHz) in an LTE technology.

A new system carrier in the embodiments of the present invention is a system carrier that includes a component carrier and an extension carrier. The extension carrier is a carrier corresponding to a bandwidth other than a standard system bandwidth. If a bandwidth of the new system carrier is 8 MHz, and a bandwidth of the standard component carrier is 5 MHz, a carrier corresponding to a remaining bandwidth of 3 MHz is the extension carrier.

In a downlink of an existing LTE technology, orthogonal frequency division multiple access (OFDMA) is used to implement resource allocation in a frequency domain based on a resource block (RB). Each resource block includes 12 subcarriers. A resource allocation granularity is a virtual resource block (VRB). There is a mapping relationship between a VRB and a physical resource block (PRB). In an existing system, standard component carriers corresponding to the six standard system bandwidths of 1.4 MHz, 3 MHz, 5 MHz, 10 MHz, 15 MHz, and 20 MHz are supported. The standard system bandwidths include different numbers of RB respectively. The number of RBs occupied by the component carrier of 1.4 MHz is 6, the number of RBs included in the standard system bandwidth of 3 MHz is 15, the number of RBs included in the standard system bandwidth of 5 MHz is 25, the number of RBs included in the standard system bandwidth of 10 MHz is 50, the number of RBs included in the standard system bandwidth of 15 MHz is 75, and the number of RBs included in the standard system bandwidth of 20 MHz is 100.

Three downlink resource allocation manners are defined in the existing LTE: a type 0, a type 1, and a type 2. The following first briefly describes the three downlink resource allocation methods separately.

(1) Resource Allocation Type 0

For the resource allocation type 0, a status of allocating resource block groups (RBG) is indicated in a bitmap (Bitmap), and an allocation granularity for the resource allocation type 0 is an RBG. The RBG is a set of consecutive localized VRBs or PRBs. An RBG size is denoted as P (that is, a quantity of VRBs or PRBs included in each RBG) (a value of P may be 1, 2, 3, or 4). P is related to a system bandwidth, and a correspondence is shown in Table 1 (Table 1 is a table of a relationship between an RBG and a system bandwidth). Herein, $N_{RB}^{DL}$ is a quantity of RBs included in a downlink system bandwidth. For the resource allocation type 0, because VRBs are mapped to PRBs in a one-to-one manner, a mapping relationship between a VRB and an RBG may also be considered as a mapping relationship between a PRB and an RBG.

TABLE 1

Table of a relationship between an RBG and a system bandwidth

| System bandwidth $N_{RB}^{DL}$ | RBG size (P) |
|---|---|
| ≤10 | 1 |
| 11-26 | 2 |

TABLE 1-continued

Table of a relationship between an RBG and a system bandwidth

| System bandwidth $N_{RB}^{DL}$ | RBG size (P) |
|---|---|
| 27-63 | 3 |
| 64-110 | 4 |

A bitmap includes $\lceil N_{RB}^{DL}/P \rceil$ bits in total, and each bit is corresponding to one RBG. Optionally, these bitmap indication bits are notified to a terminal by using a resource block assignment (Resource block assignment) field in downlink control information (DCI) sent by a base station.

In the embodiments of the present invention, a bandwidth of 5 MHz (25 RBs) is used as an example for description. It may be learned from Table 1 that P=2 (that is, each RBG includes two VRBs or PRBs), so that it is determined that there are 13 RBGs in total, and a size of the last RBG is 1. As shown in FIG. 1B (FIG. 1B is a schematic diagram 1 of RBG division), an RBG 12 includes only a PRB 24.

(2) Resource Allocation Type 1

Resource allocation type 1 is RBG-based non-contiguous VRB assignment. A resource block assignment field in DCI requires $\lceil N_{RB}^{DL}/P \rceil$ bits to indicate the resource allocation type 1. One bit in the DCI is used to indicate whether a base station uses the resource allocation type 0 or the resource allocation type 1.

RBGs are divided into P RBG subsets. For example, when a system bandwidth is 5 MHz, the RBGs are divided, as shown in Table 2 (Table 2 is a table of RBG division).

TABLE 2

Table of RBG division

| Subset 0 | RBG 0 | RBG 2 | RBG 4 | RBG 6 | RBG 8 | RBG 10 | RBG 12 |
| Subset 1 | RBG 1 | RBG 3 | RBG 5 | RBG 7 | RBG 9 | RBG 11 | |

Herein, $\lceil \log_2/P \rceil$ bits are used to indicate a selected RBG subset, one bit is used to indicate whether there is a shift of a resource in an RBG subset, and $\lceil N_{RB}^{DL}/P \rceil - \lceil \log_2/P \rceil - 1$ bits are used as a bitmap to indicate whether an RB in a corresponding subset is invoked.

(3) Resource Allocation Type 2

Resource allocation type 2 is contiguous VRB assignment. A resource indication value (RIV) is used to indicate a start location of allocated VRBs and a length in terms of the contiguously allocated VRBs. A RIV calculation manner in a protocol is as follows:

if $(L_{CRBs}-1) \leq \lfloor N_{RB}^{DL}/2 \rfloor$ then $$RIV = N_{RB}^{DL}(L_{CRBs}-1) + RB_{START}$$

else $$RIV = N_{RB}^{DL}(N_{RB}^{DL} - L_{CRBs} + 1) + (N_{RB}^{DL} - 1 - RB_{START})$$

where $L_{CRBs}$ indicates a length in terms of contiguously allocated resource blocks, $RB_{START}$ is corresponding to a location of an allocated start resource block, and $N_{RB}^{DL}$ is a quantity of RBs included in a downlink system bandwidth.

For the resource allocation type 2, a virtual resource block (VRB) needs to be mapped to a physical resource block (PRB), and a mapping manner is categorized into a localized VRB (LVRB) mapping manner and a distributed VRB (DVRB) mapping manner. One bit in a downlink type 2 resource allocation indication is used to indicate whether an LVRB or a DVRB is used. It is assumed that $n_{VRB}$ is a number of a virtual resource block, and $n_{PRB}$ is a number of a physical resource block. (1) The localized VRB mapping manner is as follows: VRBs are mapped to PRBs in a one-to-one manner, that is, $n_{PRB}=n_{VRB}$.

(2) The distributed VRB mapping manner is as follows: Each VRB is mapped to a PRB by using an interleaver. A quantity $N_{VRB}^{DL}$ of VRBs that participate in interleaving is related to a downlink system bandwidth $N_{RB}^{DL}$, a gap (Gap) value ($N_{gap}$), and an RBG size P. Optionally, the quantity $N_{VRB}^{DL}$ of VRBs that participate in interleaving is less than or equal to a quantity $N_{RB}^{DL}$ of PRBs included in the system bandwidth. A same VRB is mapped to different PRBs in two different timeslots of a same subframe. There is a value of a gap between the two different PRBs. The gap value is determined according to Table 3 (Table 3 is a table of an RB gap value).

TABLE 3

Table of an RB gap value

| | Gap ($N_{gap}$) | |
|---|---|---|
| System bandwidth ($N_{RB}^{DL}$) | $1^{st}$ gap ($N_{gap,1}$) | $2^{nd}$ gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

Figure 1C:
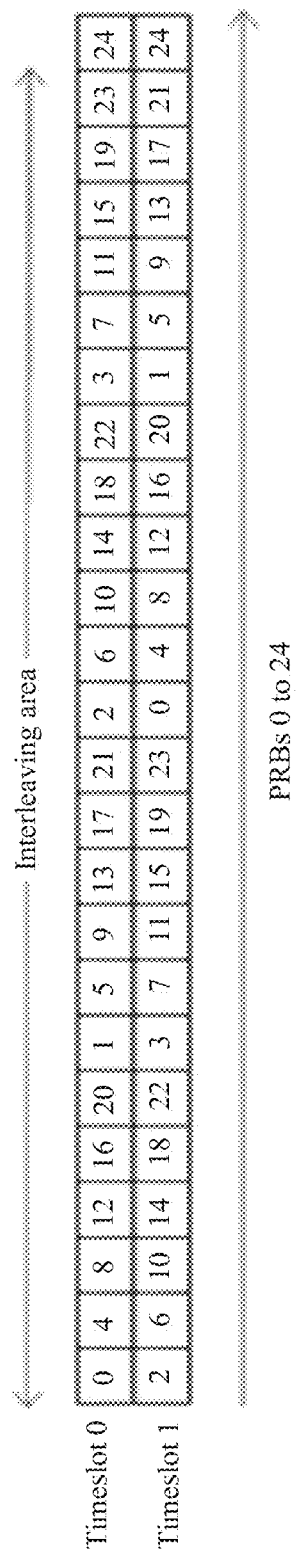
FIG. 1C is a schematic diagram 1 of distributed resource allocation.

Specifically, a manner of determining the quantity $N_{VRB}^{DL}$ of VRBs that participate in interleaving is as follows: (1) When $N_{gap}=N_{gap,1}$, $N_{VRB}^{DL}$ is determined by using a formula $N_{VRB}^{DL}=N_{VRB,gap1}^{DL}=2 \cdot \min(N_{gap}, N_{RB}^{DL}-N_{gap})$. (2) When $N_{gap}=N_{gap,2}$, $N_{VRB}^{DL}$ is determined by using a formula $N_{VRB}^{DL}=N_{VRB,gap2}^{DL}=\lfloor N_{RB}^{DL}/2N_{gap} \rfloor \cdot 2N_{gap}$. For example, when the system bandwidth is 5 MHz (25 RBs), it is determined according to Table 3 that $N_{gap}=N_{gap,1}=12$. In this case, $N_{VRB}^{DL}=2 \cdot \min(N_{gap}, N_{RB}^{DL}-N_{gap})=24$, and the quantity of VRBs that participate in interleaving is 24. That is, distributed VRB mapping is performed on only 24 VRBs (which are numbered from 0 to 23), and a VRB whose number is 24 is directly mapped to a PRB whose number is 24 (that is, the VRB 24 is mapped in the localized VRB mapping manner). A specific mapping result is shown in FIG. 1C (FIG. 1C is a schematic diagram 1 of distributed resource allocation). Because a gap=12, and a VRB 0 is mapped to a PRB 0 in a timeslot 0, the VRB 0 is mapped to a PRB (0+gap), that is, a PRB 12, in a timeslot 1.

All existing downlink resource allocation manners are used for a standard component carrier (for example, the six standard bandwidths supported by LTE). The inventor of the present invention finds that, if the existing downlink resource allocation manner is directly applied to a new system carrier (including a standard component carrier and an extension carrier), a resource allocation conflict or resource waste may be caused when resources are allocated to a conventional terminal and a new terminal that supports the new system carrier, and consequently, the new system carrier cannot be compatible with the conventional terminal.

Figures 1, 1D:
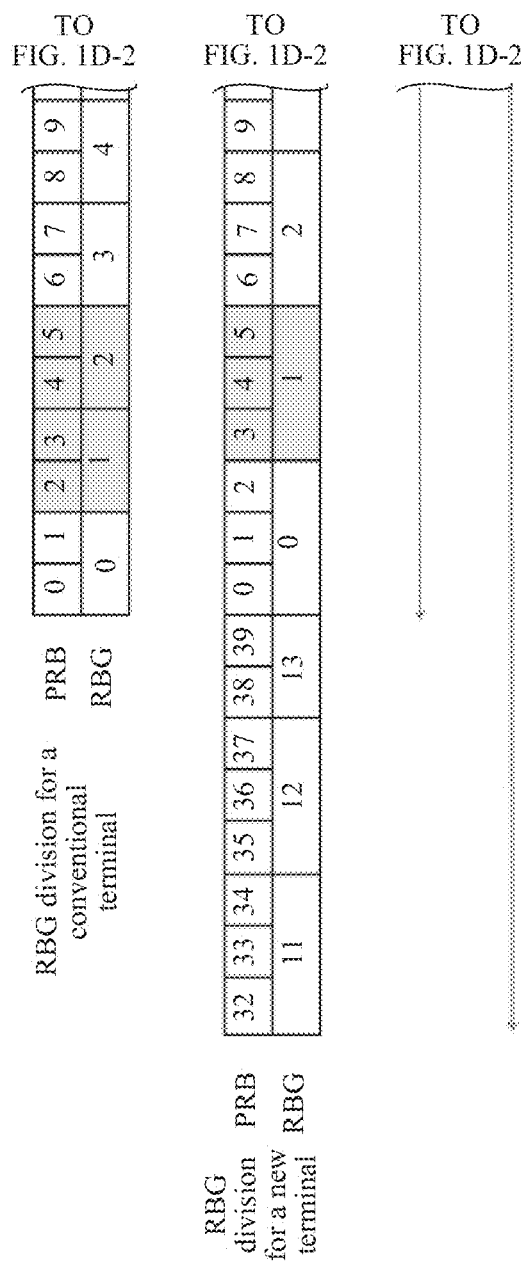
FIG. 1D-1 and FIG. 1D-2 are a schematic diagram 1 of RBG division for a conventional terminal and that for a new terminal.
Figures 1, 1D, 2:

In the embodiments of the present invention, a system bandwidth of 8 MHz (40 RBs) is used as an example for description. The conventional terminal can access only a standard system bandwidth of 5 MHz (that is, a standard component carrier), and the new terminal that supports 8 MHz can access the entire system bandwidth of 8 MHz (that is, a component carrier and an extension carrier). Specifically, it may be learned from Table 1 that when the system bandwidth is 8 MHz (the new system carrier), an RBG size (P) is 3. When the system bandwidth is 5 MHz (the standard component carrier), an RBG size (P) is 2. If resources are directly allocated according to the resource allocation type 0, RBG division for the conventional terminal and that for the new terminal are shown in FIG. 1D-1 and FIG. 1D-2 (FIG. 1D-1 and FIG. 1D-2 are a schematic diagram 1 of the RBG division for the conventional terminal and that for the new terminal). As shown in FIG. 1D-1 and FIG. 1D-2, an RBG division manner of PRBs occupied by the component carrier in the new system carrier supported by the new terminal is different from an RBG division manner of PRBs occupied by the standard component carrier supported by the conventional terminal. If an RBG 1 (corresponding to a PRB 3, a PRB 4, and a PRB 5) (indicated by a gray part in a second table in FIG. 1D-1) corresponding to the new terminal is allocated to the new terminal, an RBG 1 (corresponding to a PRB 2 and a PRB 3) and an RBG 2 (corresponding to a PRB 4 and a PRB 5) (indicated by a gray part in a first table in FIG. 1D-1) that are corresponding to the conventional terminal cannot be allocated to the conventional terminal. If the RBG 1 or the RBG 2 that are corresponding to the conventional terminal are allocated to the conventional terminal, a resource allocation conflict is caused. It may be learned that the PRB 2 corresponding to the standard component carrier supported by the conventional terminal is not used. Consequently, a resource waste is caused. Similarly, a similar resource waste problem is also caused when resources in the new system carrier are directly allocated by using the resource allocation type 1.

Figure 1E-1:
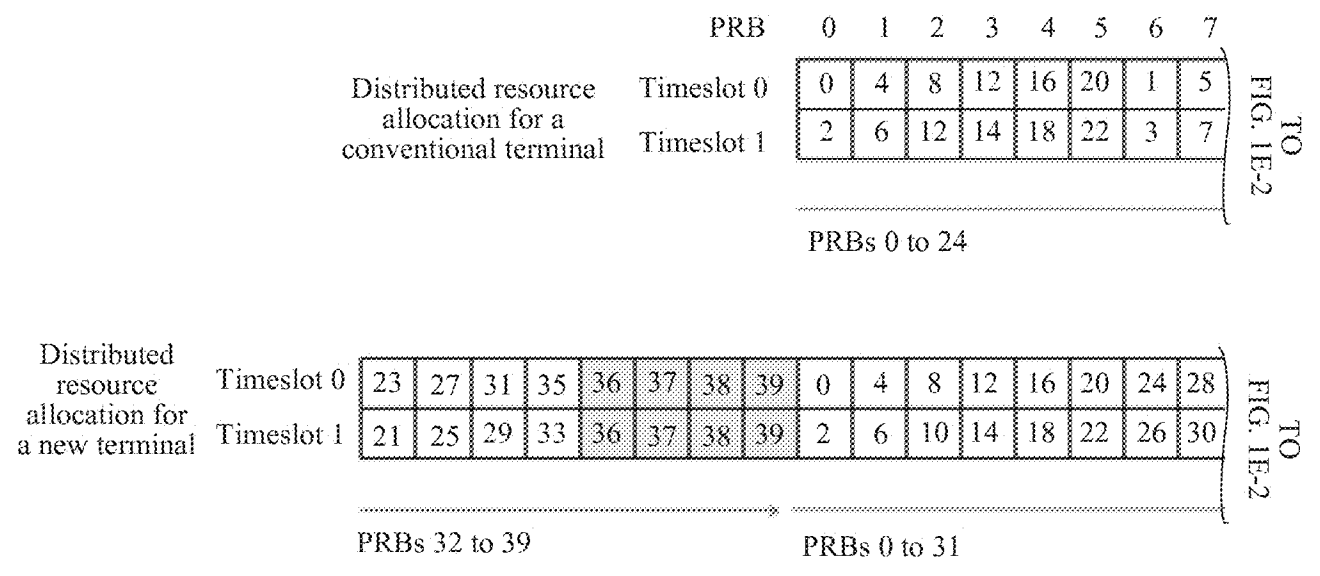
Figure 1E-2:
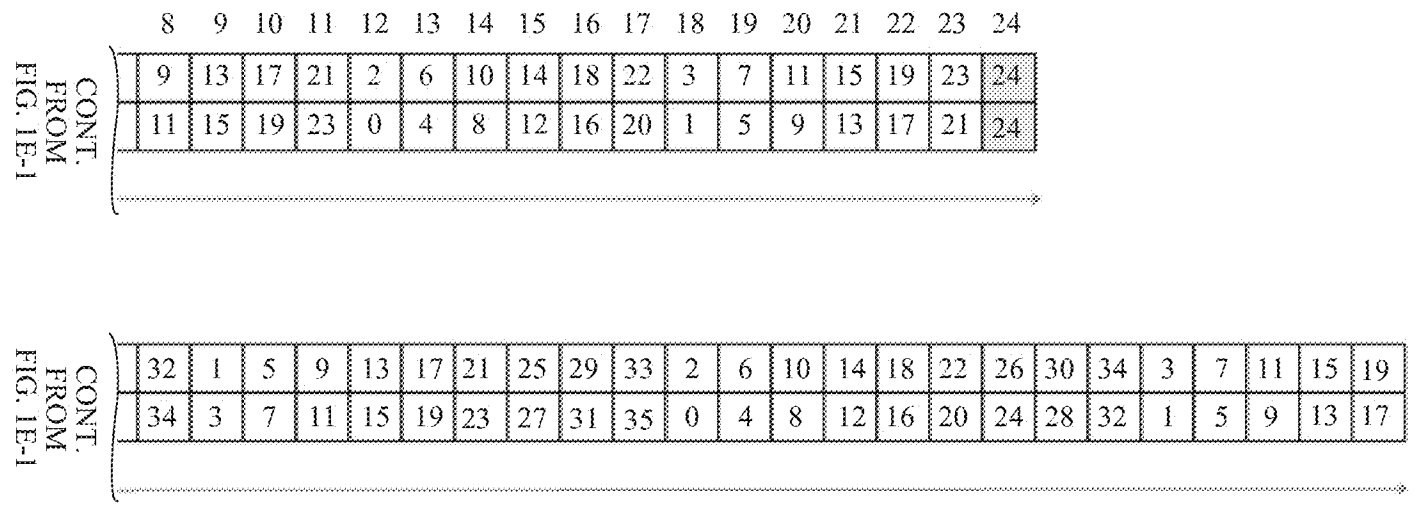

When resources in the new system carrier are directly allocated by using the resource allocation type 2, if the system bandwidth is 8 MHz (40 RBs), it is determined according to Table 3 that $N_{gap}=N_{gap,1}=18$. In this case, $N_{VRB}^{DL}=2\cdot\min(N_{gap},N_{RB}^{DL}-N_{gap})=36$, and the quantity of VRBs that participate in interleaving is 36. That is, distributed VRB mapping is performed on only 36 VRBs (which are numbered from 0 to 35), and VRBs whose numbers are 36 to 39 are directly mapped to PRBs whose numbers are 36 to 39 (that is, the VRBs 36 to 39 are mapped in the localized VRB mapping manner). A specific mapping result is shown in FIG. 1E-1 and FIG. 1E-2 (FIG. 1E-1 and FIG. 1E-2 are a schematic diagram of distributed resource allocation for the conventional terminal and that for the new terminal). Because a gap=18, and a VRB 0 is mapped to a PRB 0 in a timeslot 0 (slot 0), the VRB 0 is mapped to a PRB (0+gap), that is, a PRB 18, in a timeslot 1 (slot 1). It may be learned that because the system bandwidth used by the conventional terminal is different from that used by the new terminal, the conventional terminal and the new terminal are corresponding to different gap values and different quantities of VRBs that participate in interleaving, so that mapping relationships between a VRB and a PRB that are occupied by a standard component carrier corresponding to the conventional terminal and the new terminal are different (that is, a same VRB number is corresponding to different PRB numbers). Consequently, a resource allocation conflict may be caused, and accordingly, the new system carrier cannot be compatible with the conventional terminal.

Therefore, the embodiments of the present invention provide a resource allocation method applied to the new system carrier, to ensure that when the new terminal transmits data by using the new system carrier, the conventional terminal can also transmit data by using the standard component carrier, that is, the new system carrier is compatible with the conventional terminal, so that resource utilization can be improved.

Figure 2A:
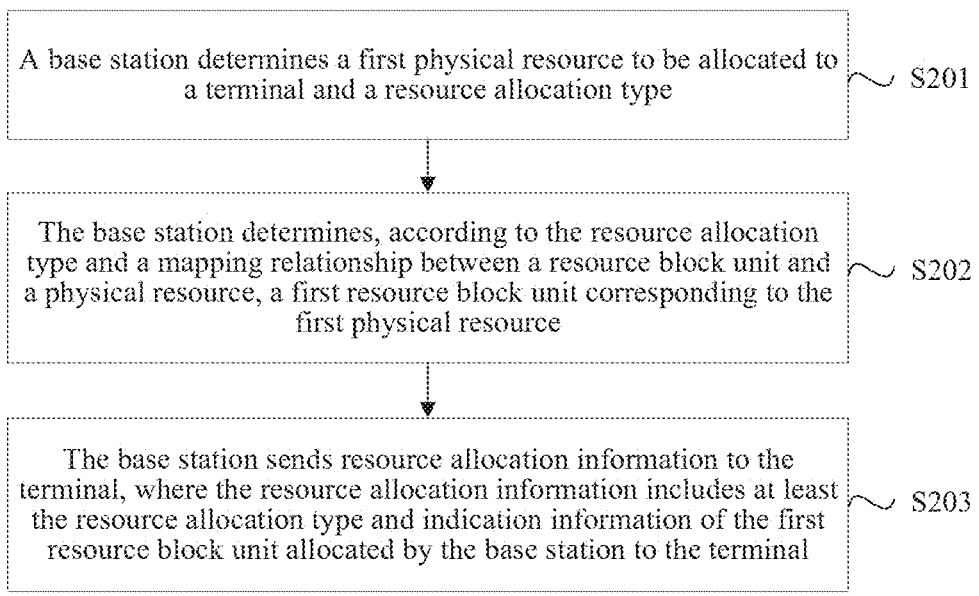
FIG. 2A is a schematic flowchart of Embodiment 1 of a resource allocation method according to the present invention.

FIG. 2A is a schematic flowchart of Embodiment 1 of a resource allocation method according to the present invention. The solution in this embodiment may be applied to a new system carrier. The new system carrier includes a component carrier and an extension carrier. As shown in FIG. 2A, the method in this embodiment may include the following steps.

S201. A base station determines a first physical resource to be allocated to a terminal and a resource allocation type.

In this embodiment of the present invention, the base station determines the first physical resource to be allocated to the terminal and the resource allocation type. The terminal is a terminal that supports a new system carrier. The new system carrier includes a component carrier and an extension carrier. The base station may determine the first physical resource and the resource allocation type according to one or more factors. For example, the base station may determine the first physical resource to be allocated to the terminal and the resource allocation type according to a resource allocation status. The resource allocation status includes information about physical resources that have been allocated, for example, information such as a quantity of physical resources that have been allocated. Specifically, if consecutive physical resources in remaining physical resources are insufficient to be allocated to the terminal, but RBGs are sufficient to be allocated to the terminal, a resource allocation type 0 or a resource allocation type 1 may be used. If RBGs in remaining physical resources are insufficient to be allocated to the terminal, a resource allocation type 2 may be used. Optionally, the resource allocation type includes, but is not limited to any one of the following types: the resource allocation type 0, the resource allocation type 1, and the resource allocation type 2. The first physical resource does not represent only one physical resource, and may represent at least one physical resource. Optionally, in this embodiment of the present invention, the physical resource may be a PRB. Correspondingly, the first physical resource may be a first PRB, and the mapping relationship between a resource block unit and a physical resource is the mapping relationship between a resource block unit and a PRB. Certainly, the physical resource may alternatively be a physical resource in another form. This is not limited in this embodiment of the present invention.

It may be understood that in this embodiment of the present invention, for a manner in which the base station determines the first physical resource to be allocated to the terminal and the resource allocation type, refer to the prior art.

S202. The base station determines, according to the resource allocation type and a mapping relationship between a resource block unit and a physical resource, a first resource block unit corresponding to the first physical resource.

The resource block unit is a resource allocation granularity in which the base station allocates a resource to the terminal for the resource allocation type. The mapping relationship between a resource block unit and a physical resource may include a first mapping relationship and a second mapping relationship. The first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier. The second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

It may be understood that the remaining part of component carrier other than the first part of component carrier in the component carrier may be zero, that is, the first part of component carrier is the entire component carrier. In this case, the first mapping relationship is a mapping relationship obtained by mapping, according to the resource allocation type and a bandwidth of the component carrier, a resource block unit occupied by the component carrier to a physical resource occupied by the component carrier. Correspondingly, the second mapping relationship is a mapping relationship obtained by mapping, according to the resource allocation type, a resource block unit occupied by the extension carrier to a physical resource occupied by the extension carrier.

In this embodiment of the present invention, the physical resource may be a physical resource block PRB, and different resource allocation types may be corresponding to different mapping relationships between a resource block unit and a physical resource. Optionally, if the resource allocation type is the resource allocation type 0 or the resource allocation type 1, the resource block unit is a resource block group RBG. Correspondingly, the mapping relationship between a resource block unit and a physical resource is a mapping relationship between an RBG and a PRB. If the resource allocation type is the resource allocation type 2, the resource block unit is a virtual resource block VRB. Correspondingly, the mapping relationship between a resource block unit and a physical resource is a mapping relationship between a VRB and a PRB.

For different resource allocation types, first resource block units corresponding to the first physical resource that are determined by the base station may also be different. For example, if the resource allocation type is the resource allocation type 0 or the resource allocation type 1, the resource block unit is a resource block group RBG, and the first resource block unit is a first RBG. If the resource allocation type is the resource allocation type 2, the resource block unit is a virtual resource block VRB, and the first resource block unit is a first VRB.

Optionally, a mapping relationship that is between a resource block unit and a physical resource and that is corresponding to each resource allocation type may be preconfigured in the base station. Alternatively, before allocating a resource to the terminal that supports the new system carrier, the base station may determine a mapping relationship that is between a resource block unit and a physical resource and that is corresponding to each resource allocation type. Specifically, the base station obtains the first mapping relationship by mapping, according to the resource allocation type and the bandwidth of the first part of component carrier in the component carrier, the resource block unit occupied by the first part of component carrier to the physical resource occupied by the first part of component carrier, and the base station obtains the second mapping relationship by mapping, according to the resource allocation type, the resource block unit occupied by the first extension carrier to the physical resource occupied by the first extension carrier, where the first extension carrier includes the extension carrier and the remaining part of component carrier other than the first part of component carrier in the component carrier.

In this embodiment of the present invention, the first mapping relationship is the mapping relationship obtained by mapping, according to the resource allocation type and the bandwidth of the first part of component carrier in the component carrier, the resource block unit occupied by the first part of component carrier to the physical resource occupied by the first part of component carrier. It may be learned that the mapping relationship between a resource block unit and a physical resource that are corresponding to the component carrier in the new system carrier is basically the same as a mapping relationship between a resource block unit and a physical resource that are corresponding to a standard component carrier. That is, a same resource block unit number is basically corresponding to a same physical resource number. Therefore, it can be ensured that when a new terminal transmits data by using the new system carrier, a conventional terminal can also transmit data by using the standard component carrier, that is, the new system carrier is compatible with the conventional terminal, so that resource utilization can be improved.

S203. The base station sends resource allocation information to the terminal, where the resource allocation information includes at least the resource allocation type and indication information of the first resource block unit allocated by the base station to the terminal.

In this embodiment of the present invention, after determining the first resource block unit corresponding to the first physical resource, the base station sends, to the terminal, the resource allocation information that includes the determined resource allocation type and the indication information of the first resource block unit allocated by the base station to the terminal. The indication information of the first resource block unit is used to indicate, to the terminal, that a resource block unit allocated by the base station to the terminal is the first resource block unit, so that the terminal learns of, according to the first resource block unit, the first physical resource allocated by the base station to the terminal, and therefore the first physical resource can be used for data transmission between the base station and the terminal. The resource allocation type is used to indicate, to the terminal, a resource allocation type used when the base station allocates a resource to the terminal, so that the terminal determines, according to the first resource block unit and a mapping relationship that is between a resource block unit and a physical resource and that is corresponding to the resource allocation type, the first physical resource allocated by the base station to the terminal. Optionally, the resource allocation information may be downlink control information DCI, may be carried in other control information and sent to the terminal, or may be a piece of independent/dedicated information. Certainly, the resource allocation information may alternatively be sent to the terminal in another manner. This is not limited in this embodiment of the present invention.

When sending the resource allocation information to the terminal by using the downlink control information (DCI), the base station may send the DCI in different DCI formats to the terminal. The different DCI formats (format) are used to indicate different resource allocation types (for example, a DCI format 1 is used to indicate the resource allocation type 0 or the resource allocation type 1, and a DCI format 1A is used to indicate the resource allocation type 2). For example, when the resource allocation type is the resource allocation type 0 or the resource allocation type 1, the base station sends the resource allocation information to the terminal by using the DCI format 1. The DCI of format 1 includes a first field used to indicate the first resource block unit and a second field used to indicate the resource allocation type (for example, the resource allocation type 0 or the resource allocation type 1). Optionally, the first field may be a resource block assignment (Resource block assignment) field. When the resource allocation type is the resource allocation type 2, because a manner of mapping a VRB to a PRB for the resource allocation type 2 includes localized VRB mapping and distributed VRB mapping, the resource allocation information may further include mapping manner information of the localized VRB mapping or the distributed VRB mapping. Optionally, the base station may send the resource allocation information to the terminal by using the DCI format 1A. The DCI of format 1A includes a first field used to indicate the first resource block unit and a second field used to indicate the mapping manner information (for example, localized VRB mapping or distributed VRB mapping). Optionally, the first field may be a resource indication value (RIV) field that is in the DCI of format 1A and that is used to indicate a segment of consecutive resources (that is, the first resource block unit). For the existing conventional terminal, $N_{RB}^{DL}$ in a RIV formula is a quantity of RBs occupied by the standard component carrier. For the new terminal that supports the extension carrier, $N_{RB}^{DL}$ in a RIV formula is a sum of quantities of RBs occupied by the component carrier and the extension carrier in the new system carrier.

Optionally, before the base station determines the first physical resource to be allocated to the terminal and the resource allocation type, the method further includes: determining, by the base station, that the terminal is a terminal that supports the new system carrier. Optionally, the base station determines a type 0f the terminal by using terminal type information reported by the terminal. For example, the terminal is a terminal that supports the new system carrier or a terminal that supports a standard component carrier. For example, terminal types 0 to 10 are defined to indicate conventional terminals, and terminal types with type numbers greater than or equal to 11 are defined to indicate terminals that support the new system carrier.

It may be learned from the foregoing description that, in this embodiment of the present invention, the resource allocation method applied to the new system carrier is implemented. It can be ensured that when the new terminal transmits data by using the new system carrier, the conventional terminal can also transmit data by using the standard component carrier, that is, the new system carrier is compatible with the conventional terminal, so that resource utilization can be improved.

In this embodiment of the present invention, the physical resource may be a physical resource block PRB. If the resource allocation type is the resource allocation type 0 or the resource allocation type 1, the resource block unit is a resource block group RBG, and the first resource block unit is a first RBG. Correspondingly, the mapping relationship between a resource block unit and a physical resource is a mapping relationship between an RBG and a PRB. The mapping relationship between an RBG and a PRB includes a first mapping relationship obtained by dividing, into at least one RBG according to a first division threshold, PRBs occupied by the first part of component carrier in the component carrier (a quantity of PRBs occupied by the first part of component carrier is an integer multiple of the first division threshold). In addition, if a quantity of PRBs occupied by the remaining part of component carrier other than the first part of component carrier in the component carrier is less than the first division threshold, the mapping relationship between an RBG and a PRB further includes a second mapping relationship obtained by dividing, into at least one RBG according to the first division threshold, PRBs occupied by the first extension carrier that includes the extension carrier and the remaining part of component carrier other than the first part of component carrier in the component carrier. The first division threshold is a quantity of PRBs included in each RBG of the component carrier. The first division threshold is determined according to the bandwidth of the component carrier and a relationship between an RBG and a system bandwidth. The relationship between an RBG and a system bandwidth includes the system bandwidth and an RBG size corresponding to the system bandwidth. For example, the first division threshold (that is, an RBG size P) may be determined according to the bandwidth of the component carrier in the new system carrier and Table 1. If the bandwidth of the component carrier is 5 MHz, the first division threshold is 2. It may be understood that if a quantity of PRBs occupied by the component carrier is an integer multiple of the first division threshold, the first mapping relationship is a mapping relationship obtained by dividing, into at least one RBG according to the first division threshold, the PRBs occupied by the component carrier. In this case, the first part of component carrier is the entire component carrier. Correspondingly, the second mapping relationship is a mapping relationship obtained by dividing, into at least one RBG according to the first division threshold, PRBs occupied by the extension carrier. According to the method in this embodiment, a mapping relationship between an RBG and a PRB that are corresponding to the component carrier in the new system carrier is basically the same as a mapping relationship between an RBG and a PRB that are corresponding to the standard component carrier. That is, a same RBG number is basically corresponding to a same PRB number. Therefore, it can be ensured that when the new terminal transmits data by using the new system carrier, the conventional terminal can also transmit data by using the standard component carrier, that is, the new system carrier is compatible with the conventional terminal, so that resource utilization can be improved.

It may be understood that when the first mapping relationship and the second mapping relationship are determined, a same division threshold or different division thresholds may be used. For example, alternatively, when the second mapping relationship is determined, the PRBs occupied by the first extension carrier that includes the extension carrier and the remaining part of component carrier other than the first part of component carrier in the component carrier may be divided into at least one RBG according to a second division threshold. The second division threshold is different from the first division threshold and is determined according to a bandwidth of the first extension carrier and the relationship between an RBG and a system bandwidth. A specific division manner is similar to a manner of determining the second mapping relationship by using the first division threshold. Details are not described herein again.

Figures 1, 2B:
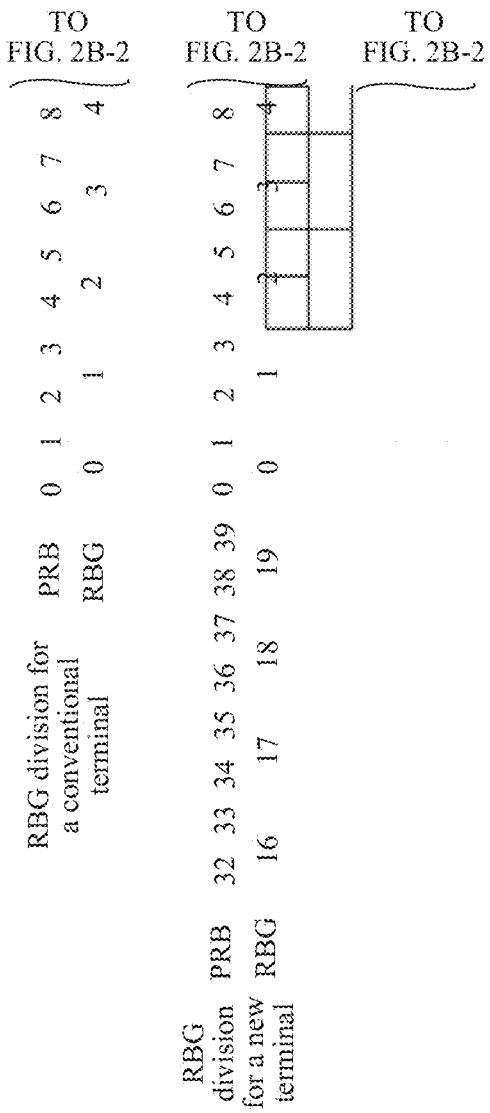
Figures 2, 2B:
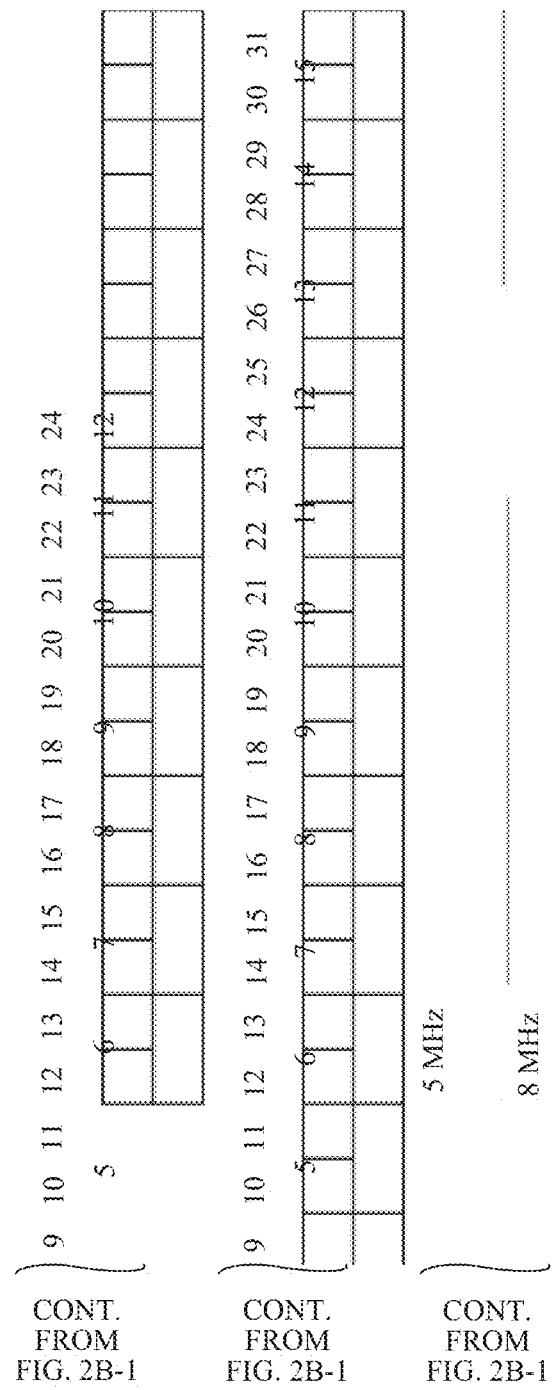

In this embodiment of the present invention, detailed descriptions are provided by using an example in which the new system carrier is of 8 MHz, the first physical resource is a first PRB, and the mapping relationship between a resource block unit and a physical resource is the mapping relationship between a resource block unit and a PRB. The bandwidth of the component carrier is 5 MHz. FIG. 2B-1 and FIG. 2B-2 are a schematic diagram 2 of RBG division for the conventional terminal and that for the new terminal. When the first division threshold (the RBG size P) is calculated, assuming that $N_{RB}^{DL}=25$, P=2. The first mapping relationship (for example, a mapping relationship between a PRB 0 to a PRB 23 and an RBG 0 to an RBG 11 in the RBG division for the new terminal in FIG. 2B-1 and FIG. 2B-2) is obtained by dividing, into at least one RBG according to the first division threshold, the PRBs (for example, the PRB 0 to the PRB 23 in the RBG division for the new terminal in FIG. 2B-1 and FIG. 2B-2) occupied by the first part of component carrier in the component carrier. As shown in FIG. 2B-1 and FIG. 2B-2, the quantity of PRBs (for example, a PRB 24 in the RBG division for the new terminal in FIG. 2B-2) occupied by the remaining part of component carrier other than the first part of component carrier in the component carrier is less than the first division threshold (P=2), and the second mapping relationship (for example, a mapping relationship between a PRB 24 to a PRB 39 and an RBG 12 to an RBG 19 shown in FIG. 2B-1 and FIG. 2B-2) is obtained by dividing, into at least one RBG according to the first division threshold, the PRBs (for example, the PRB 24 to the PRB 39 in the RBG division for the new terminal in FIG. 2B-1 and FIG. 2B-2) occupied by the first extension carrier that includes the extension carrier and the remaining part of component carrier other than the first part of component carrier in the component carrier. The first mapping relationship and the second mapping relationship are included in the mapping relationship between an RBG and a PRB. It may be learned that the mapping relationship between an RBG and a PRB (for example, the mapping relationship between the PRB 0 to the PRB 23 and the RBG 0 to the RBG 11 in the RBG division for the new terminal in FIG. 2B-1 and FIG. 2B-2) that are corresponding to the first part of component carrier in the component carrier in the new system carrier is the same as the mapping relationship between an RBG and a PRB (for example, a mapping relationship between a PRB 0 to a PRB 23 and an RBG 0 to an RBG 11 in the RBG division for the conventional terminal in FIG. 2B-1 and FIG. 2B-2) that are corresponding to the standard component carrier.

Correspondingly, that the base station determines, according to the resource allocation type and a mapping relationship between a resource block unit and a physical resource, a first resource block unit corresponding to the first physical resource includes the following steps:

The base station determines, according to the resource allocation type (for example, the resource allocation type 0 or the resource allocation type 1), that the mapping relationship between a resource block unit and a PRB is the mapping relationship between an RBG and a PRB. Further, the base station determines, according to the mapping relationship between an RBG and a PRB, a first RBG corresponding to the first PRB, so as to send, to the terminal, the resource allocation information that includes indication information of the first RBG. If the first PRB is a PRB 18 in FIG. 2B-2, the base station determines, according to the mapping relationship between an RBG and a PRB, that a first RBG corresponding to the PRB 18 is an RBG 9. It may be learned that in this embodiment of the present invention, the resource allocation method applied to the new system carrier is implemented. It can be ensured that when the new terminal transmits data by using the new system carrier, the conventional terminal can also transmit data by using the standard component carrier, that is, the new system carrier is compatible with the conventional terminal, so that resource utilization can be improved.

Optionally, if the resource block unit is a virtual resource block VRB, and the first resource block unit is a first VRB, the first mapping relationship is a mapping relationship obtained by mapping, in a distributed VRB mapping manner to physical resources occupied by the component carrier, VRBs that are in VRBs occupied by the component carrier and that participate in interleaving, where the VRBs that participate in interleaving are VRBs occupied by the first part of component carrier; and the second mapping relationship is a mapping relationship obtained by mapping, in the distributed VRB mapping manner to a physical resource occupied by the extension carrier and a remaining physical resource in physical resources occupied by the component carrier, a VRB occupied by the extension carrier and a VRB that is in the VRBs occupied by the component carrier and that does not participate in interleaving, where the VRB that does not participate in interleaving and the VRB occupied by the extension carrier are VRBs occupied by the first extension carrier. For example, if the resource allocation type is the resource allocation type 2, and a mapping manner is distributed VRB mapping, the mapping relationship between a resource block unit and a physical resource is the mapping relationship between a VRB and a physical resource. The first mapping relationship and the second mapping relationship may be obtained in the foregoing manners. It may be understood that a quantity of VRBs that are in the VRBs occupied by the component carrier and that participate in interleaving may be equal to a quantity of VRBs occupied by the component carrier. In this case, the first mapping relationship is a mapping relationship obtained by mapping, in the distributed VRB mapping manner, the VRBs occupied by the component carrier to the physical resources occupied by the component carrier. Correspondingly, the second mapping relationship is a mapping relationship obtained by mapping, in the distributed VRB mapping manner, the VRB occupied by the extension carrier to the physical resource occupied by the extension carrier.

According to the method in this embodiment, a mapping relationship between a VRB and a physical resource that are corresponding to the component carrier in the new system carrier is basically the same as a mapping relationship between a VRB and a physical resource that are corresponding to the standard component carrier. That is, a same VRB number is basically corresponding to a same physical resource number. Therefore, it can be ensured that when the new terminal transmits data by using the new system carrier, the conventional terminal can also transmit data by using the standard component carrier, that is, the new system carrier is compatible with the conventional terminal, so that resource utilization can be improved.

Optionally, the first mapping relationship is obtained in the following manner: determining a first RB gap according to a bandwidth of the component carrier, where the first RB gap is a value of a gap between PRBs to which a same VRB occupied by the component carrier is mapped in two different timeslots of a same subframe; determining, according to the bandwidth of the component carrier and the first RB gap, a quantity of VRBs that are in the VRBs occupied by the component carrier and that participate in interleaving; and mapping, in the distributed VRB mapping manner to the PRBs occupied by the component carrier, the VRBs that participate in interleaving.

In this embodiment of the present invention, detailed descriptions are provided by using an example in which the physical resource is a PRB, and the first physical resource is a first PRB. The first mapping relationship is a mapping relationship obtained according to the following steps: determining the first RB gap (for example, a gap 1) according to the bandwidth of the component carrier in the new system carrier and Table 3 in the foregoing embodiment of the present invention, where the first RB gap is a value of a gap between PRBs to which a same VRB occupied by the component carrier is mapped in two different timeslots (a timeslot 0 and a timeslot 1) of a same subframe, for example, if a VRB 0 is mapped to a PRB 0 in the timeslot 0, the VRB 0 is mapped to a PRB (0+gap 1) in the timeslot 1; further determining, according to the bandwidth of the component carrier and the first RB gap and according to the part about the "manner of determining the quantity $N_{VRB}^{DL}$ of VRBs that participate in interleaving" ($N_{RB}^{DL}$ is a quantity of RBs included in the component carrier in the new system carrier) in the foregoing embodiment of the present invention, a quantity of VRBs that are in the VRBs occupied by the component carrier and that participate in interleaving, where details of a calculation manner are not described herein again; and further mapping, in the distributed VRB mapping manner to the PRBs occupied by the component carrier, the VRBs that participate in interleaving. It may be understood that if the determined quantity of VRBs that are in the VRBs occupied by the component carrier and that participate in interleaving is equal to the quantity of VRBs occupied by the component carrier, distributed VRB mapping is performed on all the VRBs occupied by the component carrier.

Optionally, the second mapping relationship is obtained in the following manner: determining a second RB gap according to a bandwidth of the first extension carrier, where the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe; determining, according to the bandwidth of the first extension carrier and the second RB gap, a quantity of VRBs that are in the VRBs occupied by the first extension carrier and that participate in interleaving; and performing distributed VRB mapping on the VRBs that participate in interleaving, and performing localized VRB mapping on a VRB that is in the VRBs occupied by the first extension carrier and that does not participate in interleaving.

In this embodiment of the present invention, the second mapping relationship may alternatively be a mapping relationship obtained according to the following steps: determining the second RB gap (for example, a gap 2) according to the bandwidth of the first extension carrier and Table 3 in the foregoing embodiment of the present invention, where the bandwidth of the first extension carrier is the bandwidth corresponding to the VRBs (the VRB that is in the VRBs occupied by the component carrier and that does not participate in interleaving and the VRB occupied by the extension carrier are the VRBs occupied by the first extension carrier) occupied by the first extension carrier, and the second RB gap is a value of a gap between PRBs to which a same VRB occupied by the first extension carrier is mapped in two different timeslots (for example, a timeslot 0 and a timeslot 1) of a same subframe; further determining, according to the bandwidth of the first extension carrier and the second RB gap and according to the part about the "manner of determining the quantity $N_{VRB}^{DL}$ of VRBs that participate in interleaving" ($N_{RB}^{DL}$ is a quantity of RBs occupied by the first extension carrier, that is, a sum of a quantity of VRBs that are in the VRBs occupied by the component carrier and that do not participate in interleaving and a quantity of VRBs occupied by the extension carrier) in the foregoing embodiment of the present invention, a quantity of VRBs that are in the VRBs occupied by the first extension carrier and that participate in interleaving, where details of a calculation manner are not described herein again; and further performing distributed VRB mapping on the VRBs that participate in interleaving, and performing localized VRB mapping on the VRB that is in the VRBs occupied by the first extension carrier and that does not participate in interleaving, where each VRB occupied by the first extension carrier is mapped to different PRBs in the timeslot 0 and the timeslot 1 of the same subframe, and there is the gap 2 between the two different PRBs.

Figure 2C-1:
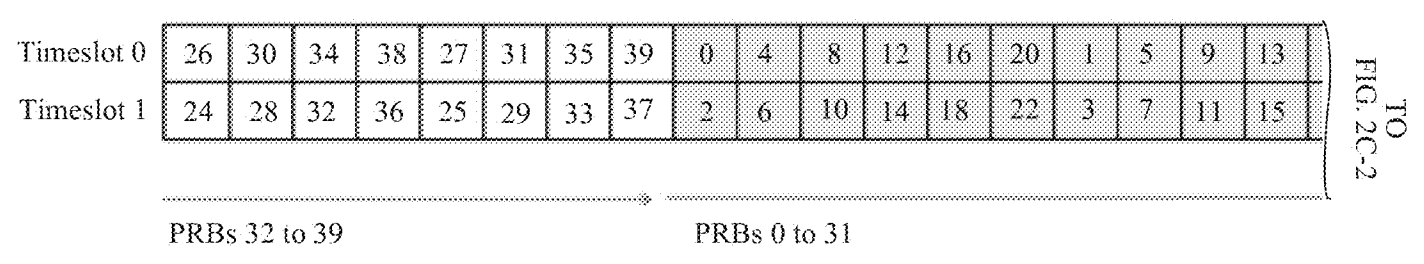
Figures 2C-1, 2C-2:
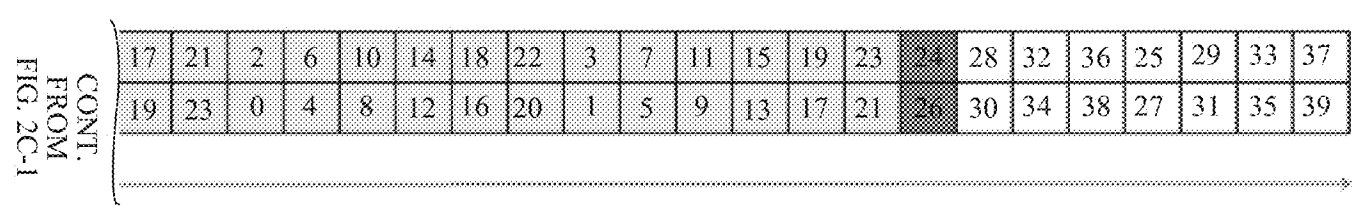

In this embodiment of the present invention, detailed descriptions are provided by using an example in which the new system carrier is of 8 MHz, the first physical resource is a first PRB, and the mapping relationship between a resource block unit and a physical resource is the mapping relationship between a resource block unit and a PRB. The bandwidth of the component carrier is 5 MHz. FIG. 2C-1 and FIG. 2C-2 are a schematic diagram 2 of distributed resource allocation. When the gap 1, the RBG size P, and the quantity of VRBs that are in the VRBs occupied by the component carrier in the new system carrier and that participate in interleaving are calculated, assuming that $N_{RB}^{DL}=25$, P=2. The first mapping relationship is a mapping relationship obtained according to the following steps: determining, according to the bandwidth ($N_{RB}^{DL}=25$) of the component carrier and Table 3 in the foregoing embodiment of the present invention, that the gap 1=12; further determining, according to the bandwidth of the component carrier and the gap 1, that the quantity of VRBs that are in the VRBs occupied by the component carrier and that participate in interleaving is 24; and further mapping, in the distributed VRB mapping manner to the PRBs (for example, a PRB 0 to a PRB 23 in FIG. 2C-1 and FIG. 2C-2) occupied by the component carrier, the VRBs that participate in interleaving. Specifically, the distributed VRB mapping is similar to an existing distributed VRB mapping process, and details are not described herein again. For one VRB that is in the VRBs occupied by the component carrier and that does not participate in interleaving, when the gap 2, the RBG size P, and the quantity of VRBs that are in the VRBs occupied by the first extension carrier and that participate in interleaving are calculated, assuming that $N_{RB}^{DL}=1+15$, P=2. The second mapping relationship is a mapping relationship obtained according to the following steps: determining, according to the bandwidth ($N_{RB}^{DL}=1+15$) of the first extension carrier and Table 3 in the foregoing embodiment of the present invention, that the gap 2=8; further determining, according to the bandwidth of the first extension carrier and the gap 2, that the quantity of VRBs that are in the VRBs occupied by the first extension carrier and that participate in interleaving is 16 (that is, distributed VRB mapping is performed on all the VRBs occupied by the first extension carrier); and further mapping, in the distributed VRB mapping manner to a remaining PRB in PRBs occupied by the component carrier and the PRBs occupied by the extension carrier (for example, a PRB 24 to a PRB 39 in FIG. 2C-1 and FIG. 2C-2), the VRBs that participate in interleaving. Specifically, the distributed VRB mapping is similar to an existing distributed VRB mapping process, and details are not described herein again. The first mapping relationship and the second mapping relationship are included in the mapping relationship between a VRB and a PRB. It may be learned that a mapping relationship between a PRB and a VRB (for example, a mapping relationship between a PRB 0 to a PRB 23 and a VRB 0 to a VRB 23 in FIG. 2C-1 and FIG. 2C-2) that is in the VRBs occupied by the component carrier in the new system carrier and that participates in interleaving is the same as the mapping relationship between a PRB and a VRB that are corresponding to the standard component carrier.

Correspondingly, the base station determines, according to the resource allocation type and a mapping relationship between a resource block unit and a physical resource, a first resource block unit corresponding to the first physical resource.

The base station determines, according to the resource allocation type (for example, the resource allocation type is the resource allocation type 2, and a mapping manner is distributed VRB mapping), that the mapping relationship between a resource block unit and a PRB is the mapping relationship between a VRB and a PRB. Further, the base station determines, according to the mapping relationship between a VRB and a PRB, a first VRB corresponding to the first PRB, so as to send, to the terminal, the resource allocation information that includes indication information of the first VRB. If the first PRB is a PRB 18 in FIG. 2C-2, the base station determines, according to the mapping relationship between a VRB and a PRB, that a first VRB corresponding to the PRB 18 is a VRB 3 (in the timeslot 0). It may be learned that in this embodiment of the present invention, the resource allocation method applied to the new system carrier is implemented. Further, the mapping relationship between a VRB and a PRB that are corresponding to the component carrier in the new system carrier is basically the same as the mapping relationship between a VRB and a PRB that are corresponding to the standard component carrier, that is, a same VRB number is basically corresponding to a same PRB number. Therefore, it can be further ensured that when the new terminal transmits data by using the new system carrier, the conventional terminal can also transmit data by using the standard component carrier, that is, the new system carrier is compatible with the conventional terminal, so that resource utilization can be improved.

Figure 3:
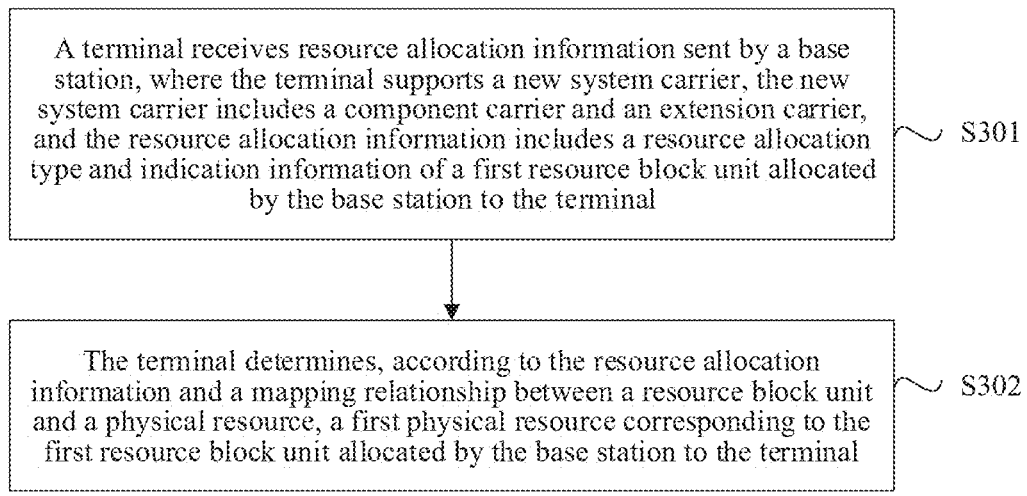
FIG. 3 is a schematic flowchart of Embodiment 2 of a resource allocation method according to the present invention.

FIG. 3 is a schematic flowchart of Embodiment 2 of a resource allocation method according to the present invention. The solution in this embodiment may be applied to a new system carrier. The new system carrier includes a component carrier (that is, a standard component carrier) and an extension carrier. In this embodiment, detailed descriptions are provided on a terminal side based on Embodiment 1 of the present invention. As shown in FIG. 3, the method in this embodiment may include the following steps.

S301. A terminal receives resource allocation information sent by a base station, where the terminal supports a new system carrier, the new system carrier includes a component carrier and an extension carrier, and the resource allocation information includes a resource allocation type and indication information of a first resource block unit allocated by the base station to the terminal.

In this embodiment of the present invention, the terminal receives the resource allocation information that is sent by the base station and that includes the resource allocation type and the indication information of the first resource block unit allocated by the base station to the terminal. The first resource block unit is a resource block unit that is corresponding to a first physical resource to be allocated by the base station to the terminal and that is determined by the base station according to a mapping relationship between a resource block unit and a physical resource and the resource allocation type determined by the base station and allocated to the terminal. For a specific manner in which the base station determines the first resource block unit, refer to Embodiment 1 of the present invention. Details are not described herein again. Optionally, in this embodiment of the present invention, the physical resource may be a PRB. Correspondingly, the first physical resource may be a first PRB, and the mapping relationship between a resource block unit and a physical resource is the mapping relationship between a resource block unit and a PRB. Certainly, the physical resource may alternatively be a physical resource in another form. This is not limited in this embodiment of the present invention.

Optionally, the indication information of the first resource block unit is used to indicate, to the terminal, that a resource block unit allocated by the base station to the terminal is the first resource block unit.

Optionally, the resource allocation type is used to indicate, to the terminal, a resource allocation type used when the base station allocates a resource to the terminal, so that the terminal determines, according to the first resource block unit and a mapping relationship that is between a resource block unit and a physical resource and that is corresponding to the resource allocation type, the first physical resource allocated by the base station to the terminal, and therefore the first physical resource can be used for data transmission between the base station and the terminal. For example, the resource allocation type may include any one of the following types: a resource allocation type 0, a resource allocation type 1, or a resource allocation type 2.

Optionally, a mapping relationship that is between a resource block unit and a physical resource and that is corresponding to each resource allocation type may be preconfigured in the terminal. Alternatively, before receiving a resource allocated by the base station, the terminal may determine a mapping relationship that is between a resource block unit and a physical resource and that is corresponding to each resource allocation type. Specifically, the terminal obtains a first mapping relationship by mapping, according to the resource allocation type and a bandwidth of a first part of component carrier in the component carrier, a resource block unit occupied by the first part of component carrier to a physical resource occupied by the first part of component carrier, and the base station obtains a second mapping relationship by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

Optionally, the resource allocation information may be downlink control information DCI, may be carried in other control information, or may be a piece of independent/dedicated information. Certainly, the terminal may alternatively receive, in another manner, the resource allocation information sent by the base station. This is not limited in this embodiment of the present invention.

When the resource allocation information is sent to the terminal by using the downlink control information (DCI), the terminal may receive DCI in different formats that is sent by the base station. The different DCI formats (format) are used to indicate different resource allocation types (for example, a DCI format 1 is used to indicate the resource allocation type 0 or the resource allocation type 1, and a DCI format 1A is used to indicate the resource allocation type 2). For example, when the resource allocation type is the resource allocation type 0 or the resource allocation type 1, the terminal may receive the DCI of format 1 sent by the base station. The DCI of format 1 includes a first field used to indicate the first resource block unit and a second field used to indicate the resource allocation type (for example, the resource allocation type 0 or the resource allocation type 1). Optionally, the first field may be a resource block assignment field. When the resource allocation type is the resource allocation type 2, because a manner of mapping a VRB to a PRB for the resource allocation type 2 includes localized VRB mapping and distributed VRB mapping, the resource allocation information may further include mapping manner information of the localized VRB mapping or the distributed VRB mapping. Optionally, the terminal may receive the DCI of format 1A sent by the base station. The DCI format 1A includes a first field used to indicate the first resource block unit and a second field used to indicate the mapping manner information (for example, localized VRB mapping or distributed VRB mapping). Optionally, the first field may be a RIV field that is in the DCI of format 1A and that is used to indicate a segment of consecutive resources (that is, the first resource block unit). For an existing conventional terminal, $N_{RB}^{DL}$ in a RIV formula is a quantity of RBs occupied by the standard component carrier. For a new terminal that supports the extension carrier, $N_{RB}^{DL}$ in a RIV formula is a sum of quantities of RBs occupied by the component carrier and the extension carrier in the new system carrier.

S302. The terminal determines, according to the resource allocation information and a mapping relationship between a resource block unit and a physical resource, a first physical resource corresponding to the first resource block unit allocated by the base station to the terminal.

The mapping relationship between a resource block unit and a physical resource includes the first mapping relationship and the second mapping relationship. The first mapping relationship is a mapping relationship obtained by mapping, according to the resource allocation type and the bandwidth of the first part of component carrier in the component carrier, the resource block unit occupied by the first part of component carrier to the physical resource occupied by the first part of component carrier. The second mapping relationship is a mapping relationship obtained by mapping, according to the resource allocation type, the resource block unit occupied by the first extension carrier to the physical resource occupied by the first extension carrier, where the first extension carrier includes the extension carrier and the remaining part of component carrier other than the first part of component carrier in the component carrier. It may be understood that the remaining part of component carrier other than the first part of component carrier in the component carrier may be zero, that is, the first part of component carrier is the entire component carrier. In this case, the first mapping relationship is a mapping relationship obtained by mapping, according to the resource allocation type and a bandwidth of the component carrier, a resource block unit occupied by the component carrier to a physical resource occupied by the component carrier. Correspondingly, the second mapping relationship is a mapping relationship obtained by mapping, according to the resource allocation type, a resource block unit occupied by the extension carrier to a physical resource occupied by the extension carrier.

Herein, for descriptions of the mapping relationship between a resource block unit and a physical resource, the first mapping relationship, and the second mapping relationship, refer to related parts in the foregoing embodiment. Details are not described herein again.

In this embodiment of the present invention, the terminal determines, according to the first resource block unit included in the resource allocation information and the mapping relationship that is between a resource block unit and a physical resource and that is corresponding to the resource allocation type, the first physical resource corresponding to the first resource block unit allocated by the base station to the terminal, so that the first physical resource can be used for data transmission between the base station and the terminal.

In this embodiment of the present invention, the first mapping relationship is the mapping relationship obtained by mapping, according to the resource allocation type and the bandwidth of the first part of component carrier in the component carrier, the resource block unit occupied by the first part of component carrier to the physical resource occupied by the first part of component carrier. It may be learned that the mapping relationship between a resource block unit and a physical resource that are corresponding to the component carrier in the new system carrier is basically the same as a mapping relationship between a resource block unit and a physical resource that are corresponding to the standard component carrier. That is, a same resource block unit number is basically corresponding to a same physical resource number. Therefore, it can be ensured that when the new terminal transmits data by using the new system carrier, the conventional terminal can also transmit data by using the standard component carrier, that is, the new system carrier is compatible with the conventional terminal, so that resource utilization can be improved.

It may be learned from the foregoing description that, in this embodiment of the present invention, the resource allocation method applied to the new system carrier is implemented. It can be ensured that when the new terminal transmits data by using the new system carrier, the conventional terminal can also transmit data by using the standard component carrier, that is, the new system carrier is compatible with the conventional terminal, so that resource utilization can be improved.

In the following embodiment of the present invention, detailed descriptions are provided by using an example in which the first physical resource is a first PRB, and the mapping relationship between a resource block unit and a physical resource is the mapping relationship between a resource block unit and a PRB.

If the resource allocation type is the resource allocation type 0 or the resource allocation type 1, the resource block unit is a resource block group RBG, and the first resource block unit is a first RBG. Correspondingly, that the terminal determines, according to the resource allocation information and a mapping relationship between a resource block unit and a physical resource, a first physical resource corresponding to the first resource block unit allocated by the base station to the terminal includes: the terminal determines the first PRB according to the indication information of the first resource block unit and a mapping relationship that is between a resource block unit and a PRB and that is corresponding to the resource allocation type. If the terminal determines, according to the resource allocation type (for example, the resource allocation type 0 or the resource allocation type 1), that the mapping relationship between a resource block unit and a PRB is a mapping relationship between an RBG and a PRB (for example, a mapping relationship obtained after RBG division for the new terminal shown in FIG. 2B-1 and FIG. 2B-2), the terminal determines, according to the mapping relationship between an RBG and a PRB and the first RBG (for example, an RBG 9), the first PRB corresponding to the first RBG, so as to transmit data to the base station by using the first PRB.

Alternatively, if the resource allocation type is the resource allocation type 2, the resource block unit is a virtual resource block VRB, and the first resource block unit is a first VRB. Correspondingly, the resource allocation information further includes mapping manner information. That the terminal determines, according to the resource allocation information and a mapping relationship between a resource block unit and a physical resource, a first physical resource corresponding to the first resource block unit allocated by the base station to the terminal includes: the terminal determines the first PRB according to the indication information of the first resource block unit and a mapping relationship that is between a resource block unit and a PRB and that is corresponding to both the resource allocation type and the mapping manner information. If the terminal determines, according to the resource allocation type (for example, the resource allocation type is the resource allocation type 2, and a mapping manner is distributed VRB mapping), that the mapping relationship between a resource block unit and a PRB is a mapping relationship between a VRB and a PRB (as shown in FIG. 2C-1 and FIG. 2C-2), the terminal determines, according to the mapping relationship between a VRB and a PRB and the first VRB (for example, a VRB 3), the first PRB (for example, a PRB 18) corresponding to the first VRB, so as to transmit data to the base station by using the first PRB.

Optionally, in this embodiment of the present invention, before the terminal receives the resource allocation information sent by the base station, the method further includes: sending, by the terminal, terminal type information to the base station, so that the base station determines, according to the terminal type information reported by the terminal, whether the terminal is a terminal that supports the new system carrier.

Figure 4:
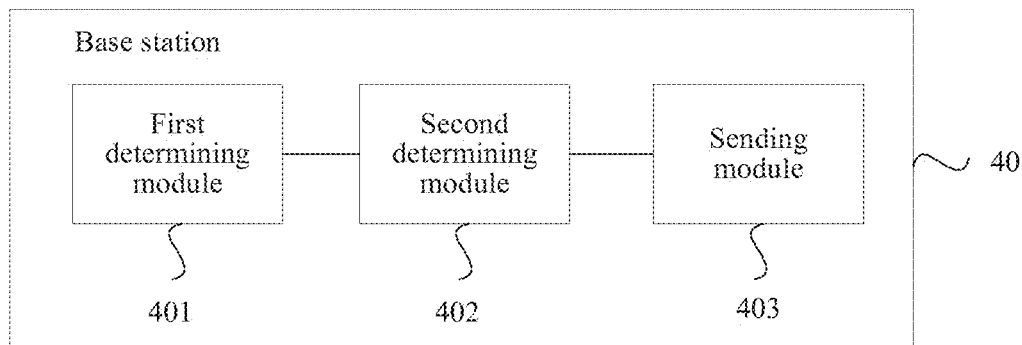
FIG. 4 is a schematic structural diagram of a base station according to an embodiment of the present invention.

FIG. 4 is a schematic structural diagram of a base station according to an embodiment of the present invention. As shown in FIG. 4, a base station 40 provided in this embodiment can support a new system carrier. The new system carrier includes a component carrier and an extension carrier. The base station may include a first determining module 401, a second determining module 402, and a sending module 403.

The first determining module 401 is configured to determine a first physical resource to be allocated to a terminal and a resource allocation type. The terminal supports a new system carrier, and the new system carrier includes a component carrier and an extension carrier.

The second determining module 402 is configured to determine, according to the resource allocation type and a mapping relationship between a resource block unit and a physical resource, a first resource block unit corresponding to the first physical resource. The resource block unit is a resource allocation granularity in which the base station allocates a resource to the terminal. The mapping relationship between a resource block unit and a physical resource includes a first mapping relationship and a second mapping relationship. The first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier. The second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

The sending module 403 is configured to send resource allocation information to the terminal. The resource allocation information includes the resource allocation type and indication information of the first resource block unit allocated by the base station to the terminal.

Optionally, the physical resource is a physical resource block PRB. If the resource allocation type is a resource allocation type 0 or a resource allocation type 1, the resource block unit is a resource block group RBG, and the first resource block unit is a first RBG.

If the resource allocation type is a resource allocation type 2, the resource block unit is a virtual resource block VRB, and the first resource block unit is a first VRB. Correspondingly, the resource allocation information further includes mapping manner information.

Optionally, the resource allocation information is downlink control information DCI.

Optionally, the base station further includes a storage module, and the storage module is configured to store the mapping relationship between a resource block unit and a physical resource.

Optionally, the base station further includes an identification module configured to determine that the terminal is a terminal that supports the new system carrier.

It may be understood that for descriptions of the mapping relationship between a resource block unit and a physical resource, the first mapping relationship, and the second mapping relationship, refer to related parts in the foregoing embodiment. Details are not described herein again. The physical resource may be a PRB.

The base station in this embodiment may be configured to perform the technical solution in Embodiment 1 of the resource allocation method in the present invention. Implementation principles and technical effects thereof are similar to those of Embodiment 1, and are not described herein.

Figure 5:
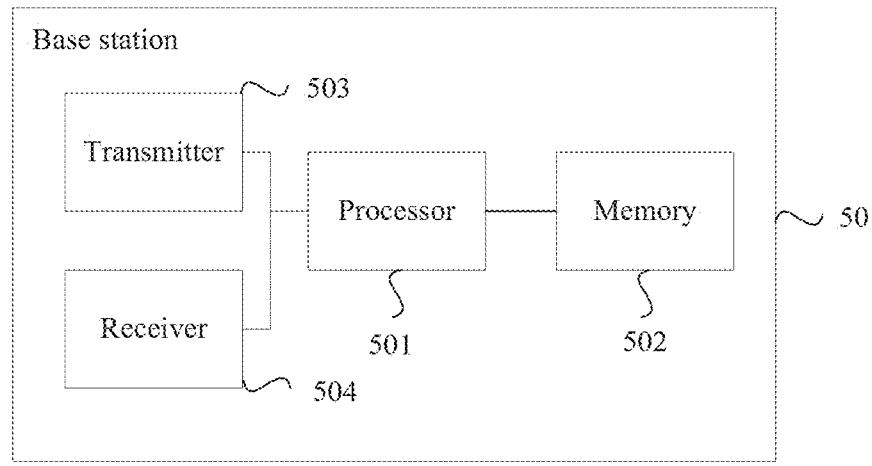
FIG. 5 is a schematic structural diagram of a base station according to another embodiment of the present invention.

FIG. 5 is a schematic structural diagram of a base station according to another embodiment of the present invention. The base station provided in this embodiment supports a new system carrier. The new system carrier includes a component carrier and an extension carrier. As shown in FIG. 5, a base station 50 provided in this embodiment may include a processor 501 and a memory 502. The base station 50 may further include a transmitter 503 and a receiver 504. The transmitter 503 and the receiver 504 may be connected to the processor 501. The transmitter 503 is configured to send resource allocation information to a terminal. The resource allocation information includes a resource allocation type and indication information of a first resource block unit allocated by the base station to the terminal. The receiver 504 is configured to receive data or information. The memory 502 is configured to store a mapping relationship between a resource block unit and a physical resource and an execution instruction. When the base station 50 runs, the processor 501 communicates with the memory 502, and the processor 501 invokes the execution instruction in the memory 502 to perform the following operations: determining a first physical resource to be allocated to the terminal and the resource allocation type, where the terminal supports a new system carrier, and the new system carrier includes a component carrier and an extension carrier; determining, according to the resource allocation type and the mapping relationship between a resource block unit and a physical resource, a first resource block unit corresponding to the first physical resource, where the resource block unit is a resource allocation granularity in which the base station allocates a resource to the terminal, the mapping relationship between a resource block unit and a physical resource includes a first mapping relationship and a second mapping relationship, the first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier, and the second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier; and controlling the transmitter to send the resource allocation information to the terminal.

Optionally, the physical resource is a physical resource block PRB. If the resource allocation type is a resource allocation type 0 or a resource allocation type 1, the resource block unit is a resource block group RBG, and the first resource block unit is a first RBG.

If the resource allocation type is a resource allocation type 2, the resource block unit is a virtual resource block VRB, and the first resource block unit is a first VRB. Correspondingly, the resource allocation information further includes mapping manner information.

Optionally, the resource allocation information is downlink control information DCI.

Optionally, the processor is further configured to determine that the terminal is a terminal that supports the new system carrier.

It may be understood that for descriptions of the mapping relationship between a resource block unit and a physical resource, the first mapping relationship, and the second mapping relationship, refer to related parts in the foregoing embodiment. Details are not described herein again. The physical resource may be a PRB.

The base station in this embodiment may be configured to perform the technical solution in Embodiment 1 of the resource allocation method in the present invention. Implementation principles and technical effects thereof are similar to those of Embodiment 1, and are not described herein.

Figure 6:
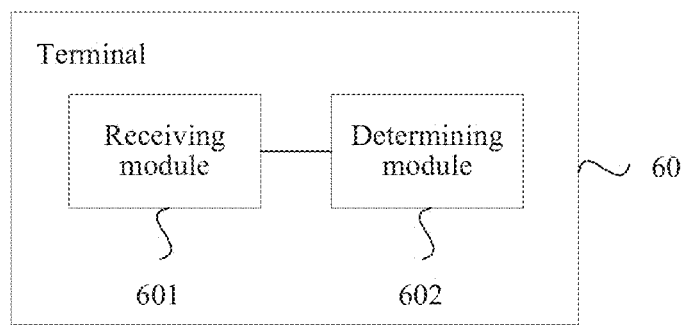
FIG. 6 is a schematic structural diagram of a terminal according to an embodiment of the present invention.

FIG. 6 is a schematic structural diagram of a terminal according to an embodiment of the present invention. As shown in FIG. 6, a terminal 60 provided in this embodiment can support a new system carrier. The new system carrier includes a component carrier and an extension carrier. The terminal 60 may include a receiving module 601 and a determining module 602.

The receiving module 601 is configured to receive resource allocation information sent by a base station. The terminal supports the new system carrier. The new system carrier includes a component carrier and an extension carrier. The resource allocation information includes a resource allocation type and indication information of a first resource block unit allocated by the base station to the terminal.

The determining module 602 is configured to determine, according to the resource allocation information and a mapping relationship between a resource block unit and a physical resource, a first physical resource corresponding to the first resource block unit allocated by the base station to the terminal. The mapping relationship between a resource block unit and a physical resource includes a first mapping relationship and a second mapping relationship. The first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier. The second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

Optionally, the physical resource is a physical resource block PRB; if the resource allocation type is a resource allocation type 0 or a resource allocation type 1, the resource block unit is a resource block group RBG, and the first resource block unit is a first RBG; and correspondingly, the determining module is specifically configured to determine the first physical resource according to the indication information of the first resource block unit and a mapping relationship that is between a resource block unit and a physical resource and that is corresponding to the resource allocation type; or if the resource allocation type is a resource allocation type 2, the resource block unit is a virtual resource block VRB, and the first resource block unit is a first VRB; correspondingly, the resource allocation information further includes mapping manner information; and the determining module is specifically configured to determine the first physical resource according to the indication information of the first resource block unit and a mapping relationship that is between a resource block unit and a physical resource and that is corresponding to both the resource allocation type and the mapping manner information.

Optionally, the resource allocation information is downlink control information DCI.

Optionally, the terminal further includes a storage module, and the storage module is configured to store the mapping relationship between a resource block unit and a physical resource.

It may be understood that for descriptions of the mapping relationship between a resource block unit and a physical resource, the first mapping relationship, and the second mapping relationship, refer to related parts in the foregoing embodiment. Details are not described herein again. The physical resource may be a PRB.

The terminal in this embodiment may be configured to perform the technical solution in Embodiment 2 of the resource allocation method in the present invention. Implementation principles and technical effects thereof are similar to those of Embodiment 2, and are not described herein.

Figure 7:
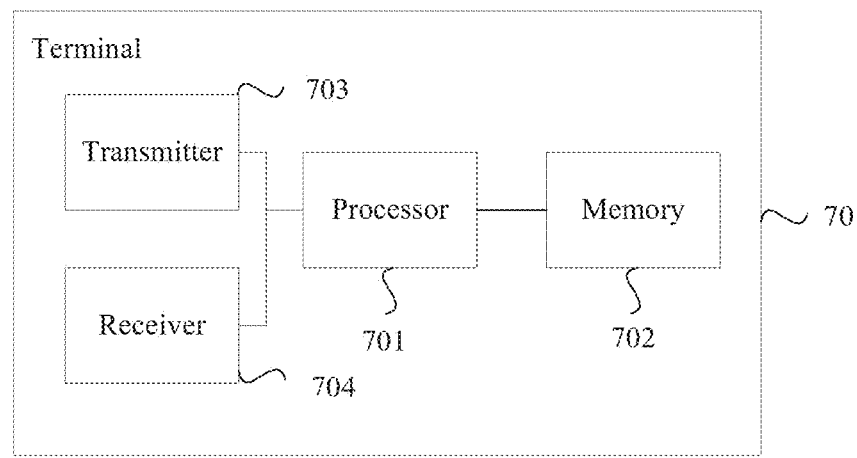
FIG. 7 is a schematic structural diagram of a terminal according to another embodiment of the present invention.

FIG. 7 is a schematic structural diagram of a terminal according to another embodiment of the present invention. The terminal provided in this embodiment supports a new system carrier. The new system carrier includes a component carrier and an extension carrier. As shown in FIG. 7, a terminal 70 provided in this embodiment may include a processor 701 and a memory 702. The terminal 70 may further include a transmitter 703 and a receiver 704. The transmitter 703 and the receiver 704 may be connected to the processor 701. The transmitter 703 is configured to send data or information. The receiver 704 is configured to receive resource allocation information sent by a base station. The terminal supports the new system carrier. The new system carrier includes a component carrier and an extension carrier. The resource allocation information includes a resource allocation type and indication information of a first resource block unit allocated by the base station to the terminal. The memory 702 stores a mapping relationship between a resource block unit and a physical resource and an execution instruction. When the terminal 70 runs, the processor 701 communicates with the memory 702, and the processor 701 invokes the execution instruction in the memory 702 to perform the following operations determining, according to the resource allocation information and the mapping relationship between a resource block unit and a physical resource, a first physical resource corresponding to the first resource block unit allocated by the base station to the terminal, where the mapping relationship between a resource block unit and a physical resource includes a first mapping relationship and a second mapping relationship, the first mapping relationship is a mapping relationship obtained by mapping, according to the resource allocation type and a bandwidth of a first part of component carrier in the component carrier, a resource block unit occupied by the first part of component carrier to a physical resource occupied by the first part of component carrier, and the second mapping relationship is a mapping relationship obtained by mapping, according to the resource allocation type, a resource block unit occupied by a first extension carrier to a physical resource occupied by the first extension carrier, where the first extension carrier includes the extension carrier and a remaining part of component carrier other than the first part of component carrier in the component carrier.

Optionally, the physical resource is a physical resource block PRB; if the resource allocation type is a resource allocation type 0 or a resource allocation type 1, the resource block unit is a resource block group RBG, and the first resource block unit is a first RBG; and correspondingly, the processor is specifically configured to determine the first PRB according to the indication information of the first resource block unit and a mapping relationship that is between a resource block unit and a PRB and that is corresponding to the resource allocation type; or if the resource allocation type is a resource allocation type 2, the resource block unit is a virtual resource block VRB, and the first resource block unit is a first VRB; correspondingly, the resource allocation information further includes mapping manner information; and the processor is specifically configured to determine the first PRB according to the indication information of the first resource block unit and a mapping relationship that is between a resource block unit and a PRB and that is corresponding to both the resource allocation type and the mapping manner information.

Optionally, the resource allocation information is downlink control information DCI.

It may be understood that for descriptions of the mapping relationship between a resource block unit and a physical resource, the first mapping relationship, and the second mapping relationship, refer to related parts in the foregoing embodiment. Details are not described herein again. The physical resource may be a PRB.

The terminal in this embodiment may be configured to perform the technical solution in Embodiment 2 of the resource allocation method in the present invention. Implementation principles and technical effects thereof are similar to those of Embodiment 2, and are not described herein.

It may be understood that in the embodiments of the present invention, resource allocation manners are described by using an example of the type 0, the type 1, and the type 2. The methods and apparatuses in the embodiments may be applied to resource allocation manners of various types.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A resource allocation method comprising:
receiving, by a terminal, resource allocation information from a base station, wherein the terminal supports a new system carrier, wherein the new system carrier comprises a component carrier and an extension carrier, and wherein the resource allocation information comprises a resource allocation type and indication information of a first resource block unit; and
determining, by the terminal, according to the resource allocation information and a mapping relationship between a resource block unit and a physical resource, a first physical resource corresponding to the first resource block unit,
wherein the mapping relationship between the resource block unit and the physical resource comprises a first mapping relationship and a second mapping relationship,
wherein the first mapping relationship is a mapping relationship obtained by mapping a resource block unit occupied by a first part of the component carrier to a physical resource occupied by the first part of the component carrier according to the resource allocation type and a bandwidth of the first part of the component carrier,
wherein the second mapping relationship is a mapping relationship obtained by mapping a resource block unit occupied by a first extension carrier to a physical resource occupied by the first extension carrier according to the resource allocation type, and
wherein the first extension carrier comprises the extension carrier and a remaining part of the component carrier.

2. The method according to claim 1,
wherein the physical resource is a physical resource block (PRB), and
wherein, when the resource allocation type is a resource allocation type 0 or a resource allocation type 1, the resource block unit is a resource block group (RBG), the first resource block unit is a first RBG and determining comprises determining a first PRB according to the indication information of the first resource block unit and a mapping relationship between a resource block unit and a PRB and that corresponds to the resource allocation type, or
wherein, when the resource allocation type is a resource allocation type 2, the resource block unit is a virtual resource block (VRB), the first resource block unit is a first VRB and determining comprises determining a first PRB according to the indication information of the first resource block unit and a mapping relationship that is between a resource block unit and a PRB and that is corresponding to both the resource allocation type and the mapping information.

3. The method according to claim 1, wherein the resource allocation information is downlink control information (DCI).

4. The method according to claim 1, further comprising sending, by the terminal, terminal type information to the base station before receiving resource allocation information from the base station.

5. A base station comprising:
a processor configured to determine a resource allocation type and a first physical resource to be allocated to a terminal, the terminal supporting a new system carrier and the new system carrier comprising a component carrier and an extension carrier,
wherein the processor is further configured to determine, according to the resource allocation type and a mapping relationship between a resource block unit and a physical resource, a first resource block unit corresponding to the first physical resource,
wherein the resource block unit is a resource allocation granularity in which the base station allocates a resource to the terminal,
wherein the mapping relationship comprises a first mapping relationship and a second mapping relationship,
wherein the first mapping relationship is a mapping relationship obtained by mapping a resource block unit occupied by a first part of the component carrier to a physical resource occupied by the first part of the component carrier according to the resource allocation type and a bandwidth of the first part of the component carrier,
wherein the second mapping relationship is a mapping relationship obtained by mapping a resource block unit occupied by a first extension carrier to a physical resource occupied by the first extension carrier according to the resource allocation type, and wherein the first extension carrier comprises the extension carrier and a remaining part of the component carrier; and
a transmitter configured to send resource allocation information to the terminal, wherein the resource allocation information comprises the resource allocation type and indication information of the first resource block unit allocated by the base station to the terminal.

6. The base station according to claim 5, wherein the physical resource is a physical resource block (PRB), wherein, when the resource allocation type is a resource allocation type 0 or a resource allocation type 1, the resource block unit is a resource block group RBG, and the first resource block unit is a first RBG, wherein, when the resource allocation type is a resource allocation type 2, the resource block unit is a virtual resource block VRB, and the first resource block unit is a first VRB, and wherein the resource allocation information further comprises mapping information.

7. The base station according to claim 6,
wherein, when the resource block unit is a resource block group (RBG) and the first resource block unit is a first RBG, the first mapping relationship is a mapping relationship obtained by dividing, into at least one RBG according to a first division threshold, PRBs occupied by the first part of the component carrier, wherein the first division threshold is determined according to a bandwidth of the component carrier and a relationship between an RBG and a system bandwidth, and wherein a number of PRBs occupied by the first part of the component carrier is an integer multiple of the first division threshold,
wherein, when a number of PRBs occupied by the remaining part of the component carrier is less than the first division threshold, the second mapping relationship is a mapping relationship obtained by dividing, into at least one RBG according to the first division threshold or a second division threshold, PRBs occupied by the first extension carrier comprising the extension carrier and the remaining part of the component carrier, wherein the second division threshold is different from the first division threshold, and wherein the second division threshold is determined according to a bandwidth of the first extension carrier and the relationship between an RBG and a system bandwidth.

8. The base station according to claim 6,
wherein, when the resource block unit is a virtual resource block (VRB) and the first resource block unit is a first VRB, the first mapping relationship is a mapping relationship obtained by mapping VRBs that are in VRBs occupied by the component carrier and that participate in interleaving, wherein the VRBs that participate in interleaving are VRBs occupied by the first part of the component carrier,
wherein the second mapping relationship is a mapping relationship obtained by mapping a VRB occupied by the extension carrier and a VRB that is in the VRBs occupied by the component carrier and that does not participate in interleaving, and wherein the VRB that does not participate in interleaving and the VRB occupied by the extension carrier are VRBs occupied by the first extension carrier.

9. The base station according to claim 8, wherein the base station is configured to obtain the second mapping relationship by:
determining a second RB gap according to a bandwidth of the first extension carrier, wherein the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe;
determining, according to the bandwidth of the first extension carrier and the second RB gap, a number of VRBs that are in the VRBs occupied by the first extension carrier and that participate in interleaving; and
performing distributed VRB mapping on the VRBs that participate in interleaving, and performing localized VRB mapping on a VRB that is in the VRBs occupied by the first extension carrier and that does not participate in interleaving.

10. The base station according to claim 5, further comprising a storage, wherein the storage is configured to store the mapping relationship between the resource block unit and the physical resource.

11. The base station according to claim 5, wherein the processor is further configured to determine that the terminal is a terminal that supports the new system carrier.

12. A terminal comprising:
a transceiver configured to receive resource allocation information from a base station, wherein the terminal supports a new system carrier, wherein the new system carrier comprises a component carrier and an extension carrier, and wherein the resource allocation information comprises a resource allocation type and indication information of a first resource block unit allocated by the base station to the terminal; and a processor configured to determine, according to the resource allocation information and a mapping relationship between a resource block unit and a physical resource, a first physical resource corresponding to the first resource block unit allocated by the base station to the terminal, wherein the mapping relationship comprises a first mapping relationship and a second mapping relationship, wherein the first mapping relationship is a mapping relationship obtained by mapping a resource block unit occupied by a first part of the component carrier to a physical resource occupied by the first part of the component carrier according to the resource allocation type and a bandwidth of the first part of the component carrier, wherein the second mapping relationship is a mapping relationship obtained by mapping a resource block unit occupied by a first extension carrier to a physical resource occupied by the first extension carrier according to the resource allocation type, and wherein the first extension carrier comprises the extension carrier and a remaining part of the component carrier.

13. The terminal according to claim 12, wherein the physical resource is a physical resource block (PRB), wherein, when the resource allocation type is a resource allocation type 0 or a resource allocation type 1, the resource block unit is a resource block group (RBG), the first resource block unit is a first RBG, and the processor is configured to determine a first PRB according to the indication information of the first resource block unit and a mapping relationship between a resource block unit and a PRB and that corresponds to the resource allocation type, wherein, when the resource allocation type is a resource allocation type 2, the resource block unit is a virtual resource block (VRB), the first resource block unit is a first VRB, and the processor is configured to determine a first PRB according to the indication information of the first resource block unit and a mapping relationship between a resource block unit and a PRB and that corresponds to both the resource allocation type and a mapping information.

14. The terminal according to claim 13, wherein, when the resource block unit is a resource block group (RBG) and the first resource block unit is a first RBG, the first mapping relationship is a mapping relationship obtained by dividing, into at least one RBG according to a first division threshold, PRBs occupied by the first part of the component carrier, wherein the first division threshold is determined according to a bandwidth of the component carrier and a relationship between an RBG and a system bandwidth, and wherein a number of PRBs occupied by the first part of the component carrier is an integer multiple of the first division threshold, wherein, when a number of PRBs occupied by the remaining part of the component carrier is less than the first division threshold, the second mapping relationship is a mapping relationship obtained by dividing, into at least one RBG according to the first division threshold or a second division threshold, PRBs occupied by the first extension carrier comprising the extension carrier and the remaining part of the component carrier, wherein the second division threshold is different from the first division threshold and, and wherein the second division threshold is determined according to a bandwidth of the first extension carrier and the relationship between an RBG and a system bandwidth.

15. The terminal according to claim 13, wherein, when the resource block unit is a virtual resource block (VRB) and the first resource block unit is a first VRB, the first mapping relationship is a mapping relationship obtained by mapping VRBs that are in VRBs occupied by the component carrier and that participate in interleaving, wherein the VRBs that participate in interleaving are VRBs occupied by the first part of the component carrier, wherein the second mapping relationship is a mapping relationship obtained by mapping a VRB occupied by the extension carrier and a VRB that is in the VRBs occupied by the component carrier and that does not participate in interleaving, and wherein the VRB that does not participate in interleaving and the VRB occupied by the extension carrier are VRBs occupied by the first extension carrier.

16. The terminal according to claim 15, wherein the first mapping relationship is obtained such that a first RB gap is determined according to a bandwidth of the component carrier, wherein the first RB gap is a value of a gap between PRBs to which a same VRB occupied by the component carrier is mapped in two different timeslots of the same subframe, and wherein, according to the bandwidth of the component carrier and the first RB gap, a number of VRBs is determined that are in the VRBs occupied by the component carrier and that participate in interleaving, and wherein the VRBs that participate in interleaving are mapped.

17. The terminal according to claim 16, wherein the second mapping relationship is obtained such that a second RB gap is determined according to a bandwidth of the first extension carrier, wherein the bandwidth of the first extension carrier is a bandwidth corresponding to the VRBs occupied by the first extension carrier, and the second RB gap is a value of a gap between PRBs to which a same VRB occupied by the first extension carrier is mapped in two different timeslots of a same subframe, wherein, according to the bandwidth of the first extension carrier and the second RB gap, a number of VRBs is determined that are in the VRBs occupied by the first extension carrier and that participate in interleaving, and wherein a localized VRB mapping is performed on a VRB that is in the VRBs occupied by the first extension carrier and that does not participate in interleaving.

18. The terminal according to claim 12, wherein the resource allocation information is downlink control information (DCI).

19. The terminal according to claim 12, further comprising a storage, wherein the storage is configured to store the mapping relationship between the resource block unit and the physical resource.

20. The terminal according to claim 12, wherein the transceiver is further configured to send terminal type information to the base station.

* * * * *